United States Patent
Date et al.

(10) Patent No.: US 9,502,932 B2
(45) Date of Patent: Nov. 22, 2016

(54) ROTOR WITH PERMANENT MAGNET HAVING STRUCTURE BETWEEN MAGNETS FOR REDUCING FLUX LEAKAGE AND DEMAGNETIZATION

(71) Applicant: HONDA MOTOR CO., LTD., Tokyo (JP)

(72) Inventors: Yasunori Date, Wako (JP); Eiji Shirado, Wako (JP); Tomotaka Iki, Wako (JP); Shingo Soma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 400 days.

(21) Appl. No.: 14/089,756

(22) Filed: Nov. 26, 2013

(65) Prior Publication Data

US 2014/0145538 A1    May 29, 2014

(30) Foreign Application Priority Data

Nov. 26, 2012   (JP) ................................ 2012-258002

(51) Int. Cl.
*H02K 1/27* (2006.01)

(52) U.S. Cl.
CPC ............ *H02K 1/2766* (2013.01); *H02K 1/272* (2013.01); *H02K 1/274* (2013.01); *H02K 1/276* (2013.01); *H02K 1/2746* (2013.01); *H02K 1/2753* (2013.01)

(58) Field of Classification Search
CPC .... H02K 1/274; H02K 1/272; H02K 1/2746; H02K 1/2753; H02K 1/276; H02K 1/2766; H02K 1/27
USPC ............ 310/156.53, 156.83, 156.38, 156.43, 310/156.46, 156.56, 156.57, 156.68, 156.72
See application file for complete search history.

(56) References Cited

U.S. PATENT DOCUMENTS

2013/0026873 A1*   1/2013   Stretz ..................... H02K 1/276
                                                                310/156.16

FOREIGN PATENT DOCUMENTS

| JP | 2008-219992 | 9/2008 | |
| WO | WO 2012/014834 | 2/2012 | |
| WO | WO 2012014834 A1 * | 2/2012 | ........... H02K 1/2766 |

OTHER PUBLICATIONS

Nakada Tohru, Rotating Electric Machine, Feb. 2, 2012, Nissan Motor Co., Ltd., WO 2012014834 English Machine Translation.*
Japanese Office Action for corresponding JP Application No. 2012-258002, Sep. 22, 2014.

* cited by examiner

*Primary Examiner* — Terrance Kenerly
*Assistant Examiner* — Alexander Singh
(74) *Attorney, Agent, or Firm* — Mori & Ward, LLP

(57) ABSTRACT

A rotor includes a rotor core and a plurality of magnetic pole parts. The rotor core has a magnet insertion hole. The magnet insertion hole includes a first peripheral edge portion and a second peripheral edge portion spaced away from the first peripheral edge portion in a radial direction of the rotor. The rotor core includes a holding part and a protrusion. The holding part extends along the radial direction from the first peripheral edge portion of the magnet insertion hole. The holding part abuts against a circumferential end portion of each of the plurality of permanent magnet pieces. The protrusion extends toward the second peripheral edge portion of the magnet insertion hole. The protrusion is spaced away in the radial direction from the second peripheral edge portion of the magnet insertion hole.

13 Claims, 23 Drawing Sheets

BACKGROUND ART

ROTOR WITH PERMANENT MAGNET HAVING STRUCTURE BETWEEN MAGNETS FOR REDUCING FLUX LEAKAGE AND DEMAGNETIZATION

CROSS-REFERENCE TO RELATED APPLICATIONS

The present application claims priority under 35 U.S.C. §119 to Japanese Patent Application No. 2012-258002, filed Nov. 26, 2012, entitled "Rotor for Rotating Electric Machine." The contents of this application are incorporated herein by reference in their entirety.

BACKGROUND

1. Field

The present disclosure relates to a rotor for a rotating electric machine.

2. Description of the Related Art

In related art, as a rotor used for a rotating electric machine, there exists a rotor for a rotating electric machine in which a plurality of storage parts are provided in a rotor core formed by a number of laminated annular steel sheets, and a permanent magnet is inserted in each of the storage parts (see, for example, Japanese Unexamined Patent Application Publication No. 2008-219992).

As shown in FIGS. 24 and 25, a rotor 110 for a rotating electric machine described in Japanese Unexamined Patent Application Publication No. 2008-219992 includes a substantially cylindrical yoke 111 with an embedded permanent magnet 113, and a bar-like shaft 112 provided along the center axis of the yoke 111. The yoke 111 has storage parts 116 that extend along the center axis. The permanent magnet 113 is stored in each of the storage parts 116, and is secured in place with resin.

The rotor 110 is stored in a cylindrical motor case (not shown), and is rotatably held inside this motor case. This motor case has a stator that can be switched in polarity.

SUMMARY

According to one aspect of the present invention, a rotor for a rotating electric machine includes a rotor core and a plurality of magnetic pole parts. The rotor core has a magnet insertion hole. The magnet insertion hole includes a first peripheral edge portion and a second peripheral edge portion spaced away from the first peripheral edge portion in a radial direction of the rotor. The plurality of magnetic pole parts are provided inside the rotor core at a predetermined interval in a circumferential direction of the rotor. The plurality of magnetic pole parts are magnetized in the radial direction. The plurality of magnetic pole parts are provided such that magnetization directions of the plurality of magnetic pole parts are alternately different from each other in the circumferential direction. Each of the plurality of magnetic pole parts includes a permanent magnet provided in the magnet insertion hole of the rotor core. The permanent magnet includes a plurality of permanent magnet pieces that are divided in the circumferential direction within the magnet insertion hole. The rotor core includes a holding part and a protrusion. The holding part is provided between the plurality of permanent magnet pieces that are adjacent to each other in the circumferential direction. The holding part extends along the radial direction from the first peripheral edge portion of the magnet insertion hole. The holding part abuts against a circumferential end portion of each of the plurality of permanent magnet pieces. The protrusion is provided on a radial end face of the holding part. The protrusion has a circumferential width smaller than a circumferential width of the holding part. The protrusion extends toward the second peripheral edge portion of the magnet insertion hole. The protrusion is spaced away in the radial direction from the second peripheral edge portion of the magnet insertion hole.

According to another aspect of the present invention, a rotor for a rotating electric machine includes a rotor core and a plurality of magnetic pole parts. The rotor core has a magnet insertion hole. The magnet insertion hole including a first peripheral edge portion and a second peripheral edge portion spaced away from the first peripheral edge portion in a radial direction of the rotor. The plurality of magnetic pole parts are provided inside the rotor core at a predetermined interval in a circumferential direction of the rotor. The plurality of magnetic pole parts are magnetized in the radial direction. The plurality of magnetic pole parts are provided such that magnetization directions of the plurality of magnetic pole parts are alternately in the circumferential direction. Each of the plurality of magnetic pole parts includes a permanent magnet provided in the magnet insertion hole of the rotor core. The permanent magnet includes a plurality of permanent magnet pieces that are divided in the circumferential direction within the magnet insertion hole. The rotor core includes a holding part provided between the plurality of permanent magnet pieces that are adjacent to each other in the circumferential direction. The holding part extends along the radial direction from the first peripheral edge portion of the magnet insertion hole. The holding part abuts against a circumferential end portion of each of the plurality of permanent magnet pieces. The protrusion is provided between the plurality of permanent magnet pieces that are adjacent to each other in the circumferential direction. The protrusion extends along the radial direction from the second peripheral edge portion of the magnet insertion hole. The protrusion has a circumferential width smaller than a circumferential width of the holding part. The holding part and the protrusion are spaced away from each other in the radial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 26:
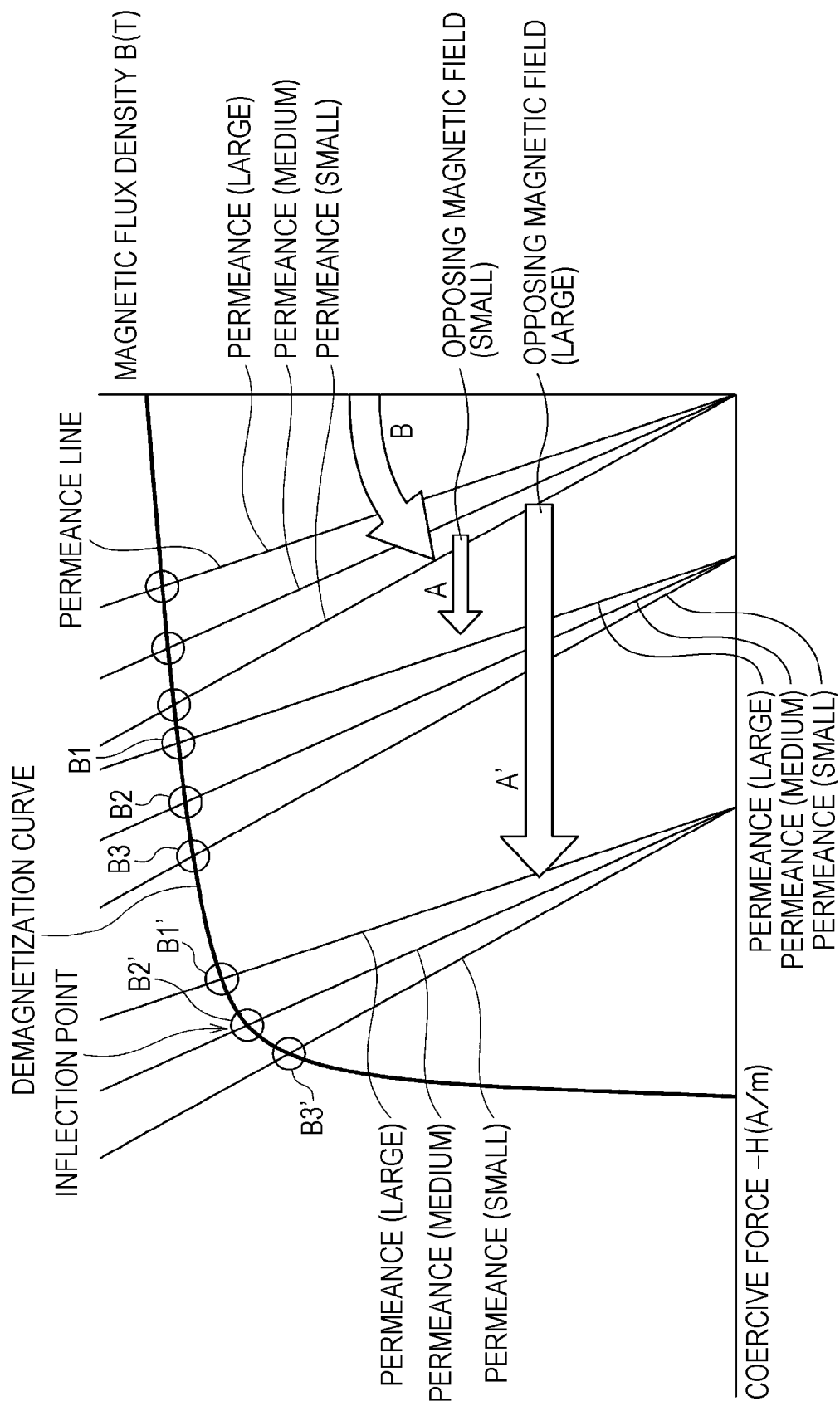
FIG. 26 is a graph showing the demagnetization curve and permeance line of a permanent magnet.

FIG. 26 is a graph showing the demagnetization curve and permeance line of a permanent magnet, with magnetic flux density (B(T)) along the vertical axis and coercive force (-H(A/m)) along the horizontal axis. The operating point of a permanent magnet is determined by the intersection of the demagnetization curve and the permeance line (the portion indicated by ○ in FIG. 26). When current is applied to the stator, an opposing magnetic field acts on the permanent magnet, causing the permeance line to move in the negative direction as indicated by arrows A and A'.

In a case where a small opposing magnetic field acts on the permanent magnet, the movement of the permeance line in the negative direction is also small as indicated by the arrow A. Consequently, the intersection B1, B2, or B3 of the demagnetization curve and the permeance line is located before (upper side in FIG. 26) of the inflection point. Therefore, demagnetization does not occur in the permanent magnet, or even if demagnetization does occur, the amount of such demagnetization is small.

In a case where a large opposing magnetic field acts on the permanent magnet, the movement of the permeance line in the negative direction is also large as indicated by the arrow A'. Consequently, the intersection B1', B2', or B3' of the demagnetization curve and the permeance line is located near the inflection point, which may cause demagnetization of the permanent magnet.

At this time, in locations where the permeance of the permanent magnet is large, the slope of the permeance line (coefficient of permeance) is large. Consequently, the intersection B1' of the demagnetization curve and the permeance line is located before the inflection line, and the amount of demagnetization of the permanent magnet is small. However, in locations where the permeance of the permanent magnet is small, the slope of the permeance line is small and tilts in the direction indicated by an arrow B. Consequently, the intersection B3' of the demagnetization curve and the permeance line lies beyond the inflection point, causing a rapid decrease in magnetic flux density. Once the magnetic flux density decreases beyond the inflection point in a part of the permanent magnet in this way, even when the influence of the opposing magnetic field disappears, the magnetic flux density of the permanent magnet becomes lower than the original magnetic flux density, causing demagnetization of the permanent magnet.

As described above, the larger the opposing magnetic field applied, and the smaller the permeance, the greater the amount of demagnetization of the permanent magnet. That is, the smaller the opposing magnetic field applied, and the greater the permeance, the more the demagnetization of the permanent magnet can be prevented.

Figure 25:
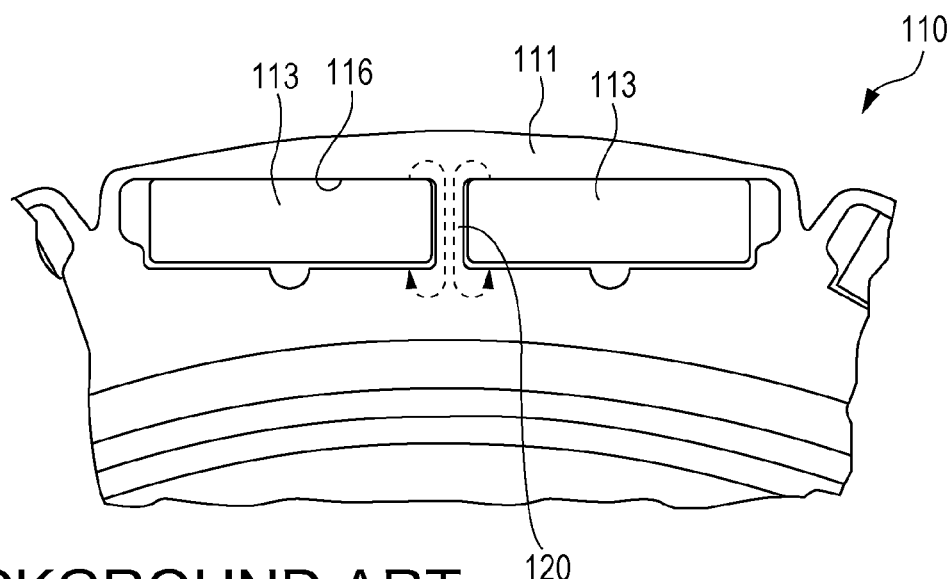
FIG. 25 is a partial enlarged view of the rotor shown in FIG. 24.

In this regard, in the rotor 110 described in Japanese Unexamined Patent Application Publication No. 2008-219992, a center rib 120 that connects the outer peripheral side and inner peripheral side of the yoke 111 is formed between the storage parts 116 that are adjacent to each other in the circumferential direction. Consequently, as indicated by broken arrows in FIG. 25, there is a possibility that the main magnetic flux directed toward the stator on the outer peripheral side from the permanent magnet 113 in each of the storage parts 116 may be short-circuited to the inner peripheral side via the center rib 120, causing a decrease in the driving torque of the motor.

Figure 27:
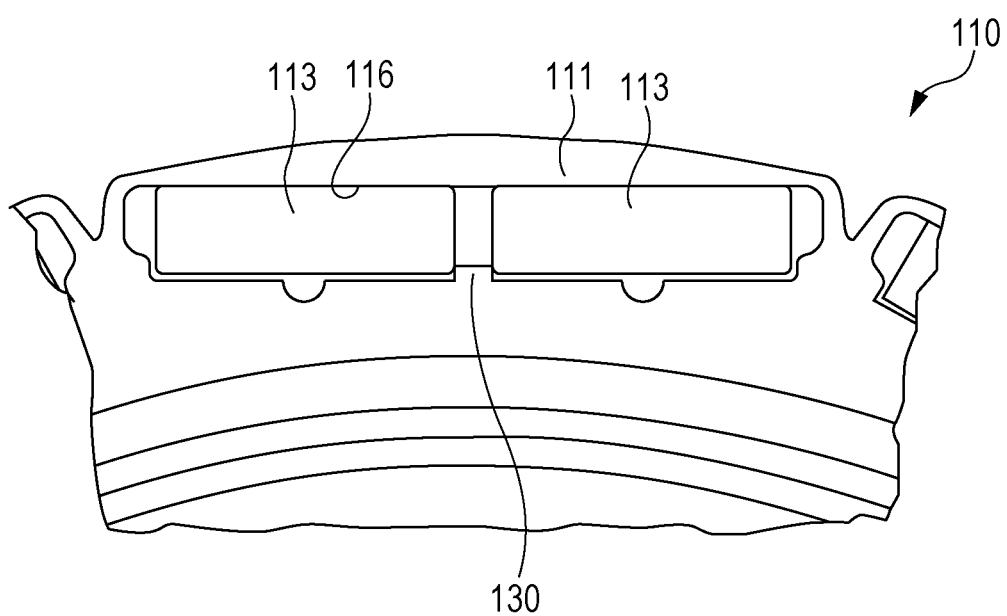
FIG. 27 is a partial enlarged view of a rotor as a comparative example according to related art.

Accordingly, as shown in FIG. 27, it is conceivable to remove the center rib 120 from the rotor 110, and instead provide the rotor 110 with a holding part 130 that abuts against the circumferential end portion of the permanent magnet 113, thereby preventing the short-circuiting of magnetic flux described above while positioning the permanent magnet 113 in the circumferential direction.

However, although the above-mentioned configuration makes it possible to prevent a decrease in the driving torque of the motor, under the environment of the opposing magnetic field from the stator, the absence of the center rib 120 that serves as a path for opposing magnetic field components in the rotor 110 means that the opposing magnet field applied to the permanent magnet 113 increases. Further, because the center rib 120 made of a steel sheet does not exist near the permanent magnet 113, the permeance of the permanent magnet 113 also becomes small. As a result, there is a possibility that the permanent magnet 113 may be demagnetized.

The embodiments provide a rotor for a rotating electric machine which can prevent demagnetization of a permanent magnet while preventing a decrease in torque.

The embodiments will now be described with reference to the accompanying drawings, wherein like reference numerals designate corresponding or identical elements throughout the various drawings.

Hereinafter, a rotor for a rotating electric machine according to embodiments of the present disclosure will be described.

First Embodiment

Figure 1:
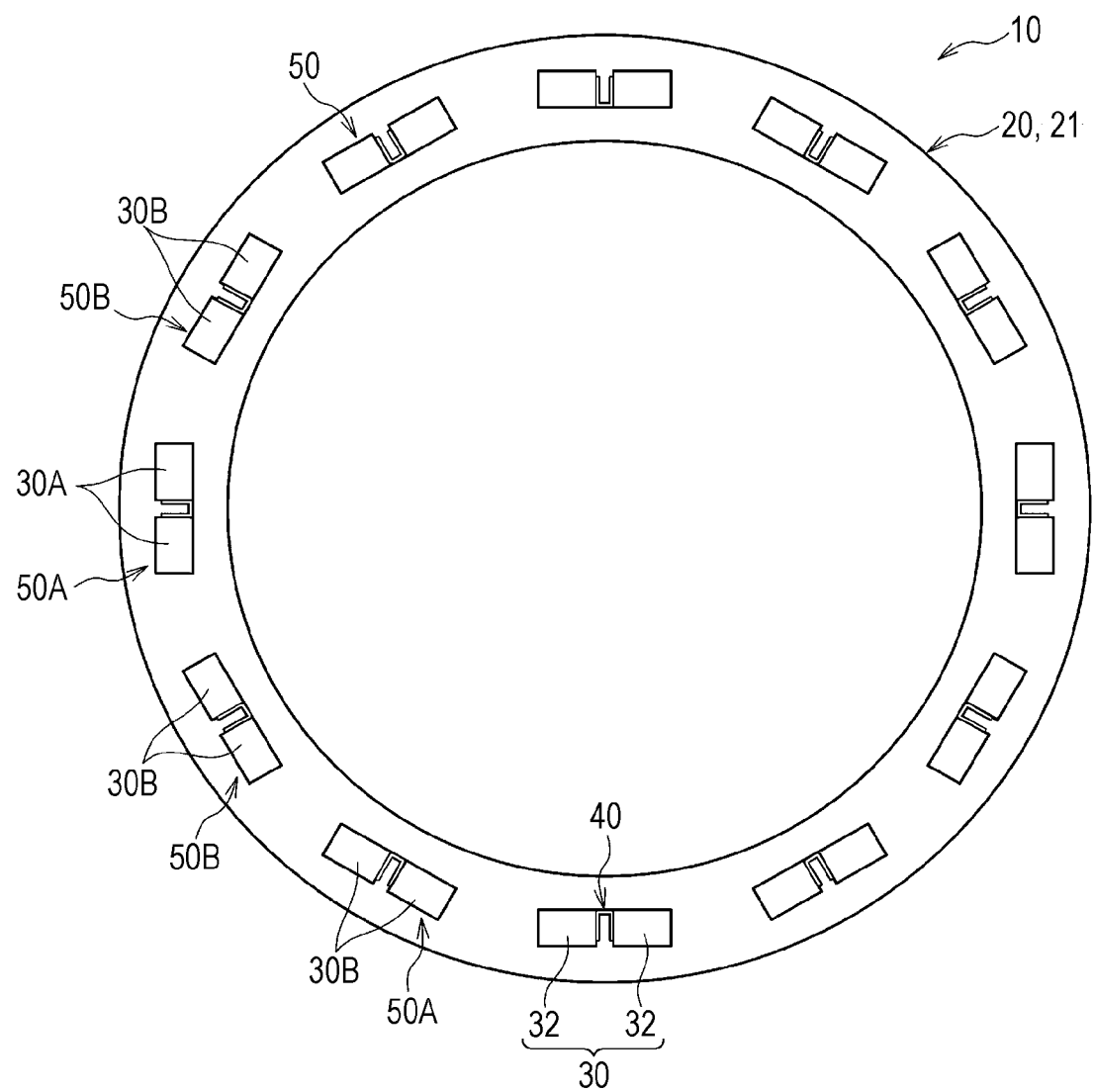
FIG. 1 is a front view of a rotor according to a first embodiment.

As shown in FIG. 1, a rotor 10 for a rotating electric machine according to a first embodiment includes a rotor core 20, and a plurality of magnetic pole parts 50 (hereinafter "magnetic pole parts 50" or also singularly "magnetic pole part 50"). The rotor core 20 is mounted on the outer peripheral side of a substantially cylindrical rotor shaft (not shown) that is a rotating shaft. The magnetic pole parts 50 are formed inside the rotor core 20 at predetermined intervals in the circumferential direction. The rotor 10 is placed on the inner peripheral side of a stator (not shown).

The rotor core 20 is formed by laminating a number of annular magnetic steel sheets of substantially the same shape, for example, silicon steel sheets 21. The rotor core 20 has a plurality of magnetic insertion holes 40 (hereinafter "magnet insertion holes 40" or also singularly "magnet insertion hole 40") formed at predetermined intervals in the circumferential direction.

The magnetic pole parts 50 are magnetized in the radial direction, with a permanent magnet 30 inserted in the magnet insertion hole 40 so as to differ in magnetization direction alternately in the circumferential direction. More specifically, supposing that a magnetic pole part 50A having a permanent magnet 30A inserted in the magnet insertion hole 40 has an N-pole on its outer peripheral side. In this case, a magnetic pole part 50B adjacent to the magnetic pole part 50A has a permanent magnet 30B inserted in the magnet insertion hole 40 in such a way that its outer peripheral side is an S-pole.

The permanent magnet 30 includes a pair of permanent magnet pieces 32 (hereinafter "permanent magnet pieces 32" or also singularly "permanent magnet piece 32") that are divided in the circumferential direction. The pair of permanent magnet pieces 32 have the same substantially rectangular shape in cross section, and are placed in parallel to each other.

Figure 2:
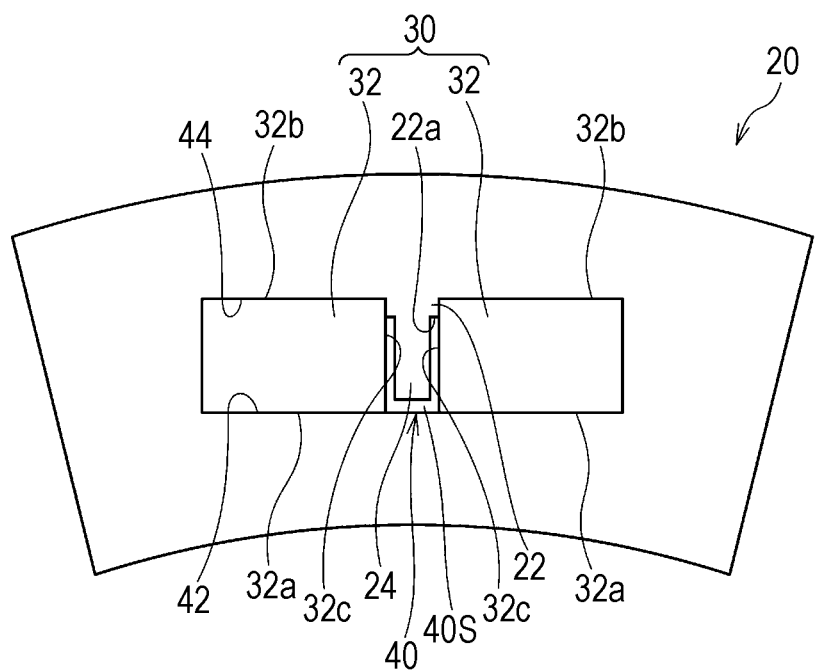
FIG. 2 is a partial enlarged view of the rotor shown in FIG. 1.

As shown in FIG. 2, an inner peripheral edge portion 42 and an outer peripheral edge portion 44 of the magnet insertion hole 40 abut against an inner peripheral surface 32a and an outer peripheral surface 32b, respectively, of each of the pair of permanent magnet pieces 32, thereby positioning the pair of permanent magnets 32 in the radial direction.

The rotor core 20 has a holding part 22 formed between the pair of permanent magnet pieces 32 in the circumferential direction. The holding part 22 extends radially inwards from the outer peripheral edge portion 44 of the magnet insertion hole 40, and has a substantially rectangular shape in cross section. Referring to also FIG. 3, the holding part 22 has a circumferential width D1 that is substantially equal to the circumferential width L1 between the pair of permanent magnet pieces 32. The holding part 22 abuts against an inner circumferential end portion 32c (circumferential end portion) of each of the pair of permanent magnet pieces 32, thereby positioning and holding the pair of permanent magnet pieces 32 in place in the circumferential direction.

An inner radial end face 22a (radial end face) of the holding part 22 is provided with a protrusion 24 having a substantially rectangular shape in cross section. The protrusion 24 extends toward the inner peripheral edge portion 42 of the magnet insertion hole 40, that is, the protrusion 24 extends radially inwards. The protrusion 24 has a circumferential width d1 that is smaller than the circumferential width D1 of the holding part 22. The protrusion 24 is spaced away from the inner circumferential end portion 32c of each of the pair of permanent magnet pieces 32.

The radial width d2 of the protrusion 24 is set larger than the radial width D2 of the holding part 22. In this regard, the sum (D2+d2) of the radial widths of the holding part 22 and protrusion 24 is set smaller than the radial width L2 between the inner peripheral edge portion 42 and the outer peripheral edge portion 44 of the magnet insertion hole 40 (D2+d2<L2). Thus, the protrusion 24 is spaced away from the inner peripheral edge portion 42 of the magnet insertion hole 40 in the radial direction. Therefore, short-circuiting of magnetic flux via a center rib as in related art is prevented, thereby making it possible to prevent a decrease in torque. The above related art is described in, for example, Japanese Unexamined Patent Application Publication No. 2008-219992, the entire contents of which are incorporated herein by reference.

An air gap 40S in the magnet insertion hole 40 in which the pair of permanent magnet pieces 32 are not inserted is filled with fixing resin (not shown), thereby more firmly securing the pair of permanent magnet pieces 32 in place.

Figure 4:
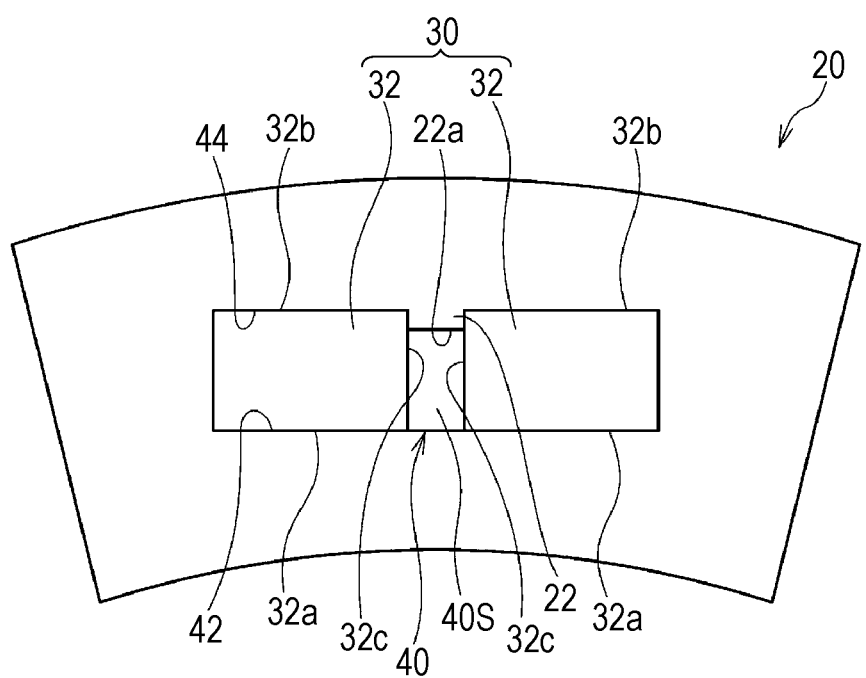
FIG. 4 is a partial enlarged view of a rotor according to a comparative example.

For the rotor core 20 according to this embodiment configured as described above, in order to investigate the effects of this configuration on prevention of a decrease in torque and on prevention of demagnetization of the permanent magnet 30 (permanent magnet piece 32), analysis of the permeance distribution of the permanent magnet 30, analysis of the magnetic circuit (magnetic path) of the rotor core 20, analysis of the opposing magnetic field from the stator applied to the rotor core 20, and analysis of the demagnetization distribution of the permanent magnet 30 were conducted. As a comparative example, the same analyses were conducted for the rotor core 20 that is not provided with the protrusion 24 as shown in FIG. 4.

Figure 5:
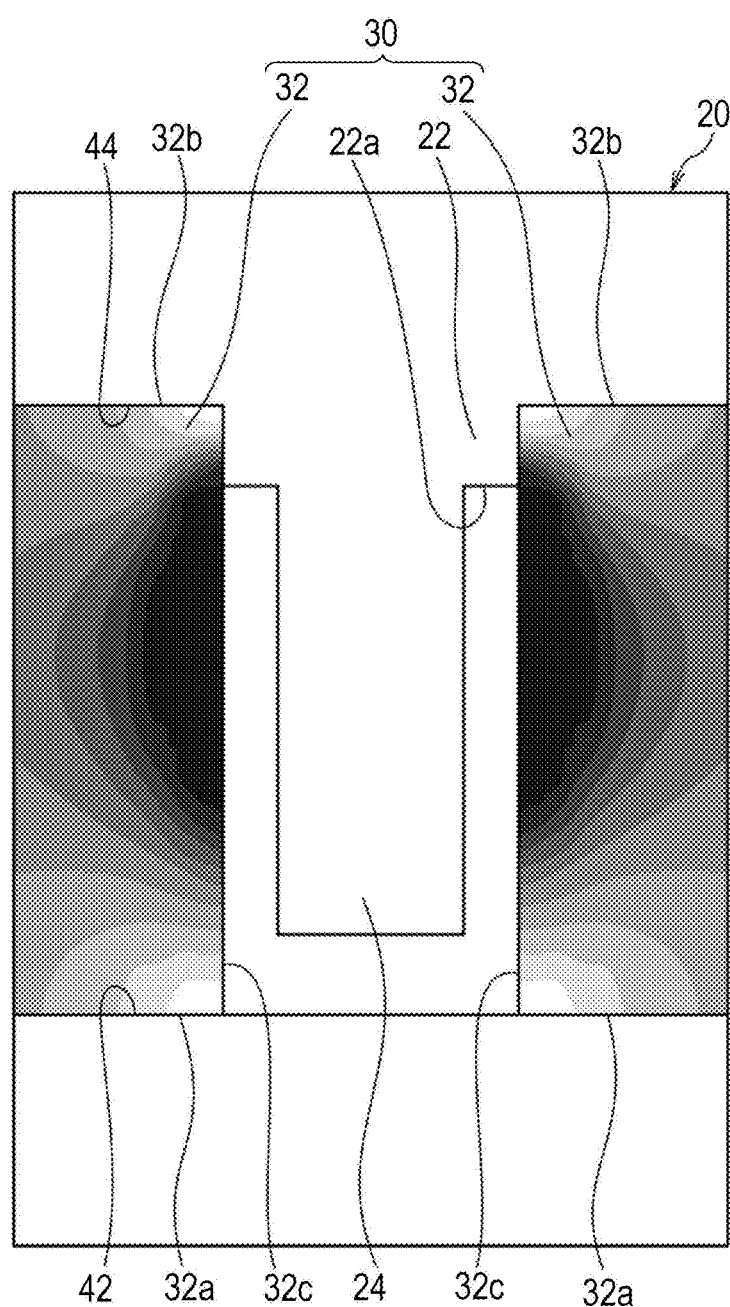
FIG. 5 shows the permeance distribution of a permanent magnet according to the first embodiment.
Figure 6:
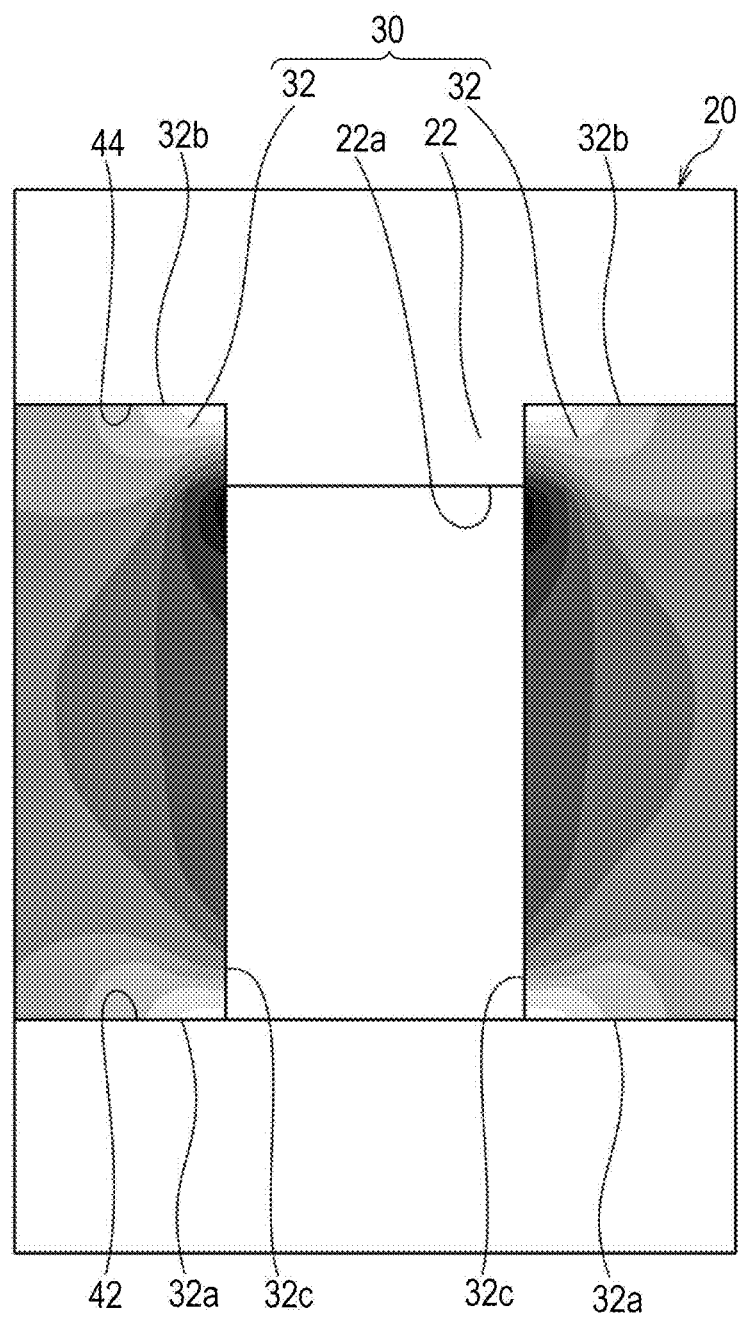
FIG. 6 shows the permeance distribution of a permanent magnet according to the comparative example.
Figure 7:
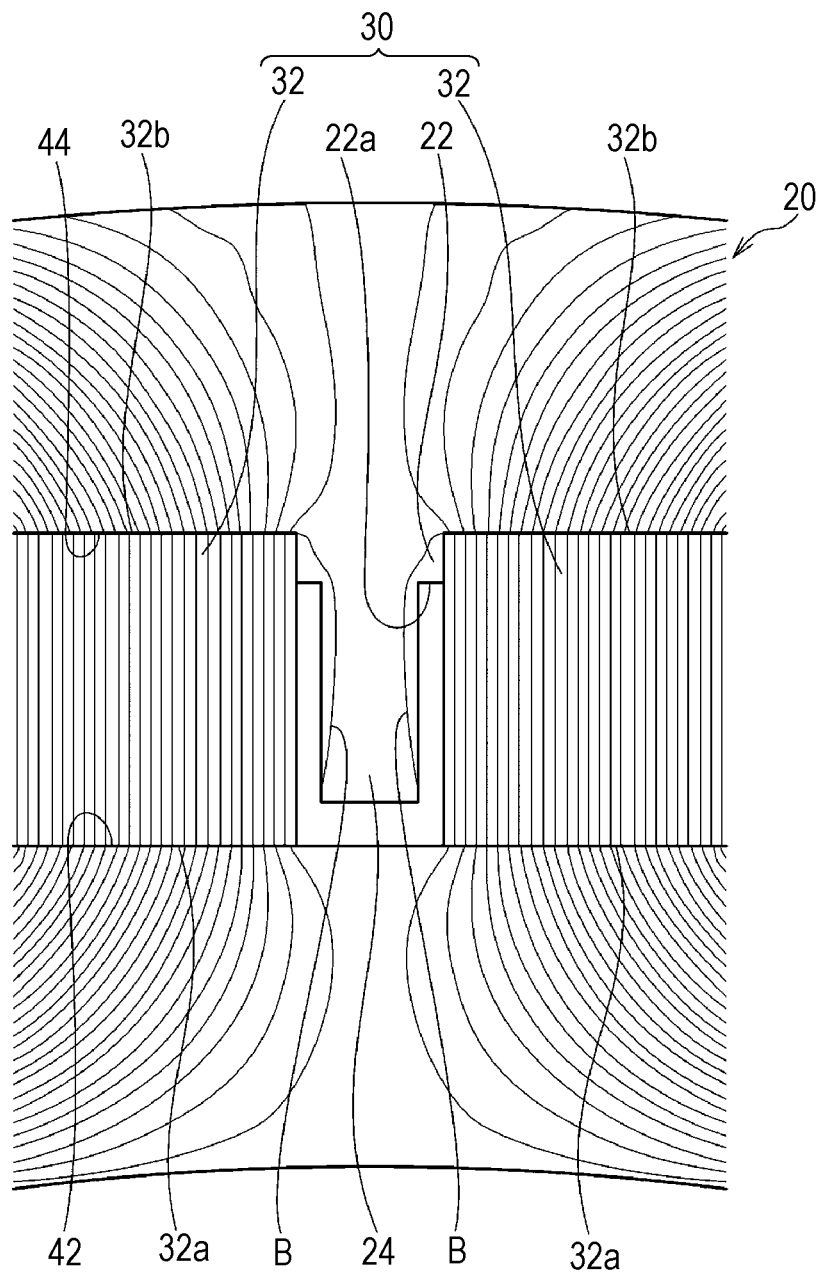
FIG. 7 shows magnetic paths within a rotor core according to the first embodiment.
Figure 8:
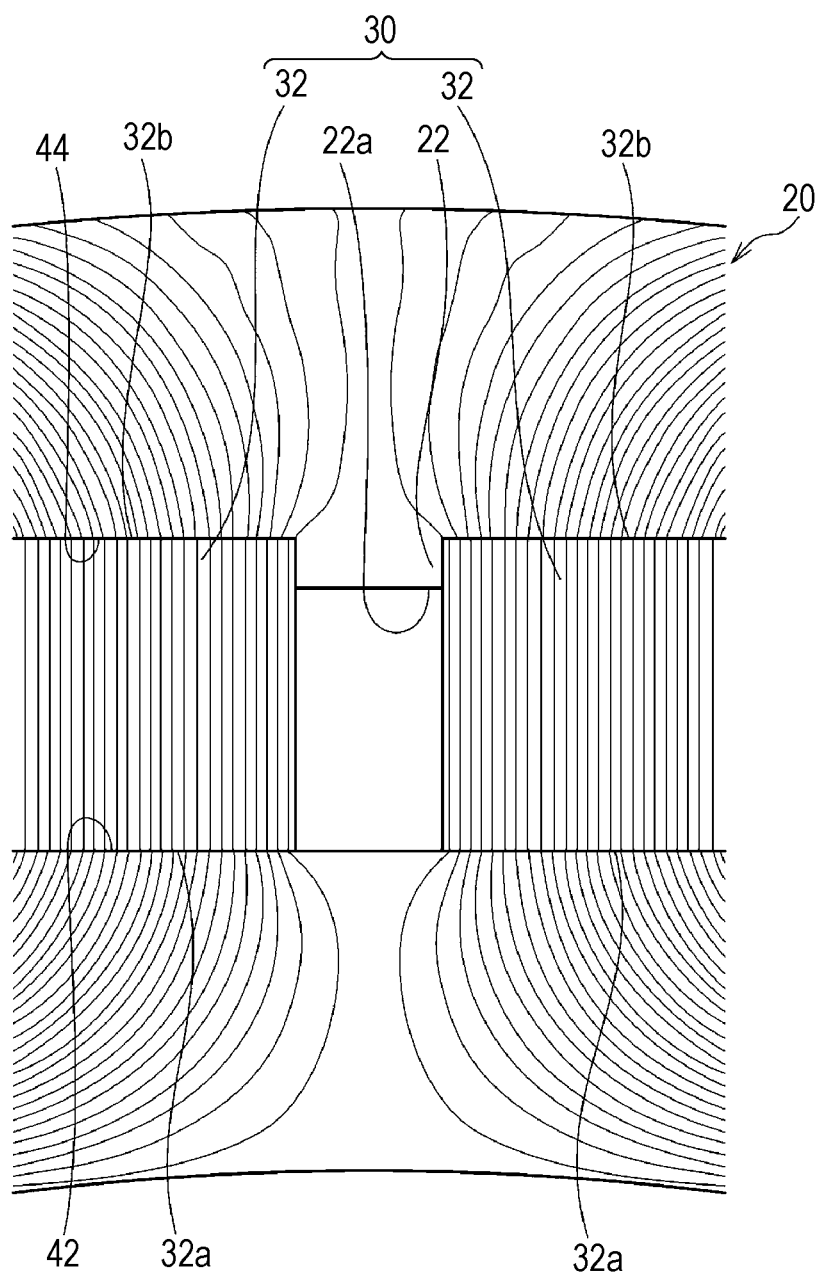
FIG. 8 shows magnetic paths within a rotor core according to the comparative example.
Figure 9:
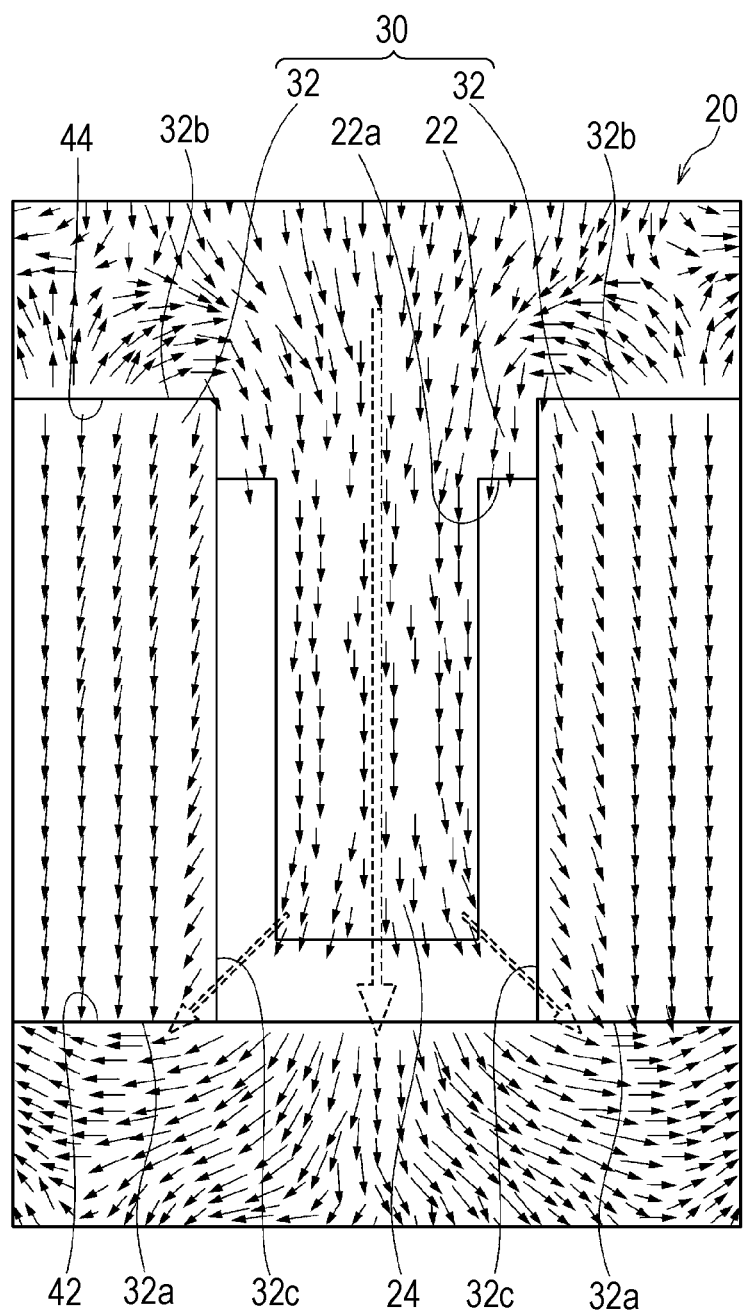
FIG. 9 shows a direction in which the opposing magnetic field from a stator is applied, within the rotor core according to the first embodiment.
Figure 10:
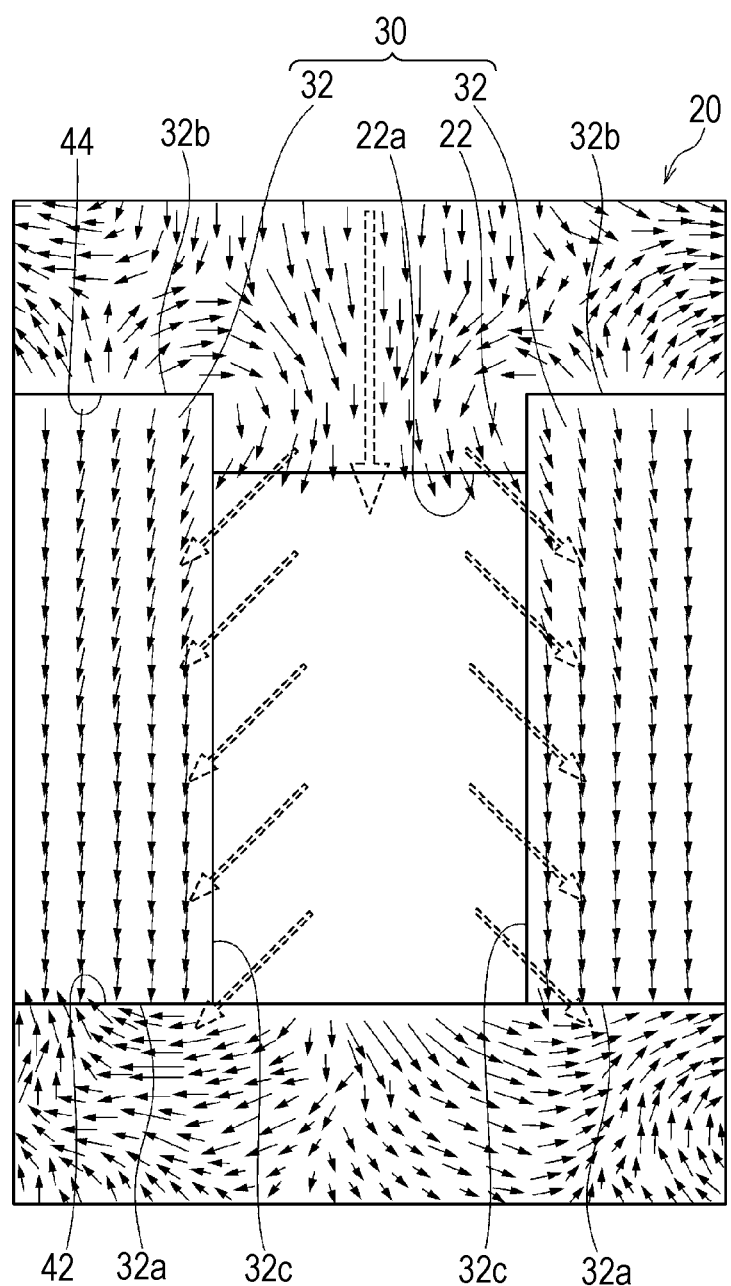
FIG. 10 shows a direction in which the opposing magnetic field from a stator is applied, within the rotor core according to the comparative example.
Figure 11:
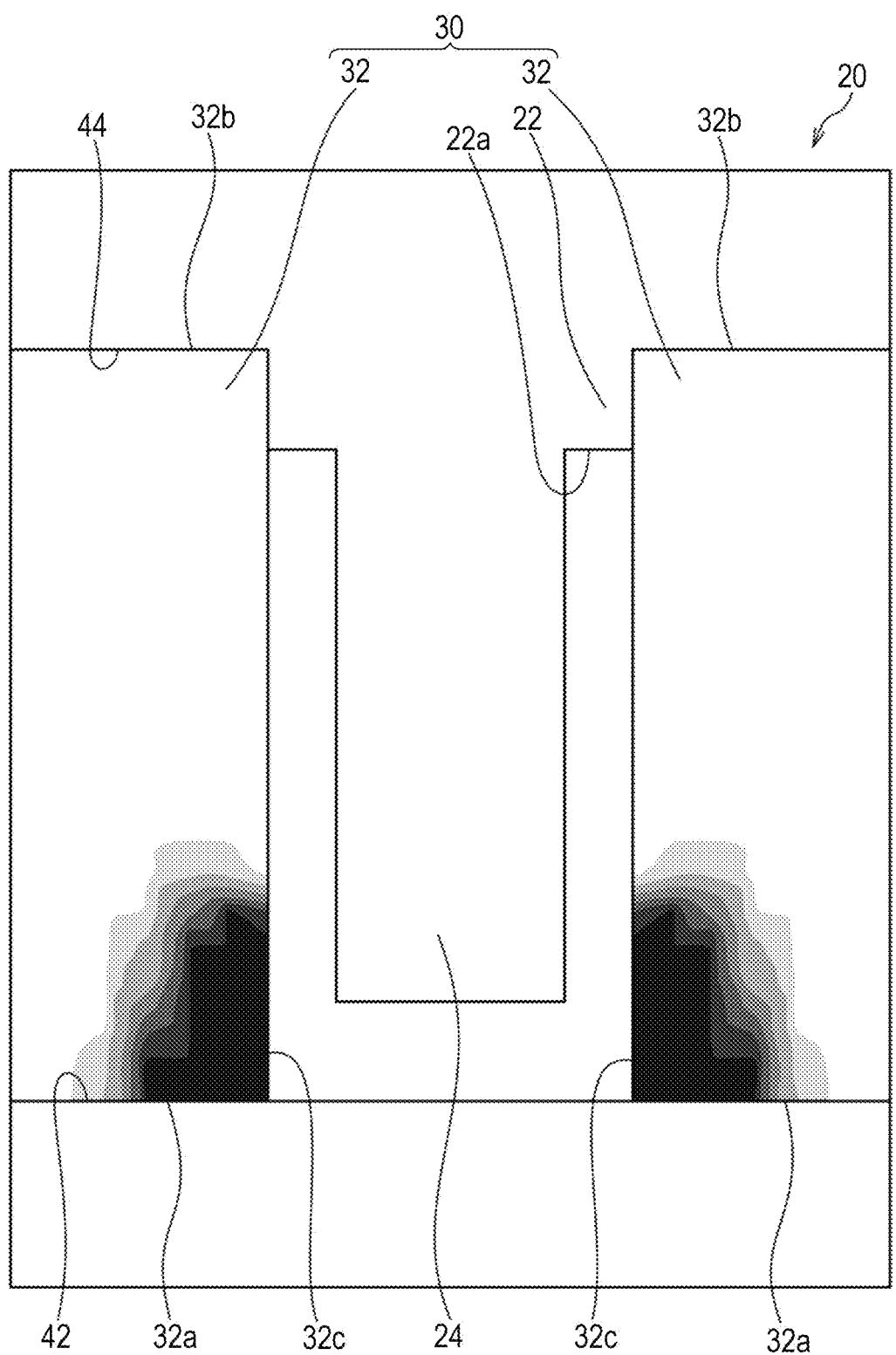
FIG. 11 shows the demagnetization distribution of the permanent magnet according to the first embodiment.
Figure 12:
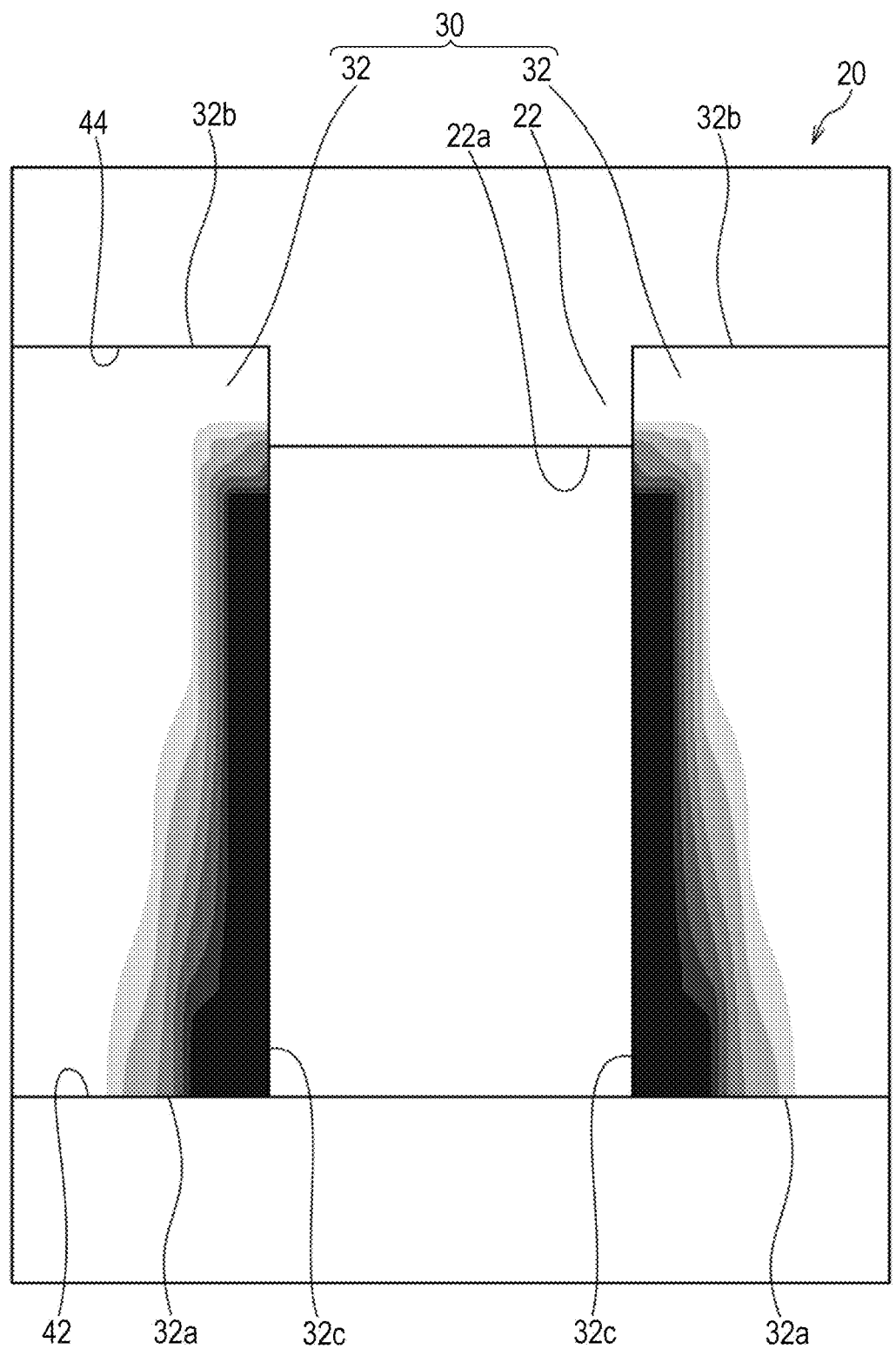
FIG. 12 shows the demagnetization distribution of the permanent magnet according to the comparative example.

FIGS. 5 and 6 show the permeance distributions of the permanent magnet according to this embodiment and the comparative example, respectively, in shades of grey, where darker portions of the permanent magnet pieces 32 mean higher permeance, and lighter portions mean lower permeance. FIGS. 7 and 8 show magnetic paths within the rotor core 20 according to this embodiment and the comparative example, respectively. FIGS. 9 and 10 show directions, as indicated by solid lines, in which the opposing magnetic field from the stator is applied within the rotor core 20 according to this embodiment and the comparative example, respectively. FIGS. 11 and 12 show the demagnetization distributions of the permanent magnet 30 according to this embodiment and the comparative example, respectively, in shades of grey, where darker portions of the permanent magnet pieces 32 mean higher demagnetization, and lighter portions mean lower demagnetization.

First, in this embodiment, the protrusion 24 is spaced away from the inner peripheral edge portion 42 of the magnet insertion hole 40 in the radial direction, whereas in the comparative example, the holding part 22 is spaced away from the inner peripheral edge portion 42 of the magnet insertion hole 40 in the radial direction. Therefore, it is appreciated that as shown in FIGS. 7 and 8, in both cases, short-circuiting of magnetic flux via a center rib as in the related art described in Japanese Unexamined Patent Application Publication No. 2008-219992 does not occur, and a decrease in torque is prevented.

Next, the permeance distribution of the permanent magnet 30 will be discussed. The permeance P of the permanent magnet 30 is represented by the following equation:

$$P = \mu \times (A/L)$$

where μ denotes magnetic permeability, A denotes magnetic path cross-sectional area, and L denotes magnetic path length.

Comparing FIGS. 7 and 8 with each other, in this embodiment, in comparison to the comparative example, the provision of the protrusion 24 creates a pair of new magnetic paths B passing through the holding part 22 and the protrusion 24, causing the magnetic path length L to increase. At this time, the magnetic path cross-sectional area A also increases, and hence a change in the element (A/L) in the above-mentioned equation is small. However, in this embodiment, the provision of the protrusion 24 made of laminated steel sheets within the magnetic path causes the magnetic permeability μ to increase. Therefore, the permeance P of the permanent magnet piece 32 near the protrusion 24 improves in comparison to the comparative example (see FIGS. 5 and 6).

Comparing FIG. 9 and FIG. 10 with each other, in the comparative example, the opposing magnetic field from the stator located on the outer peripheral side of the rotor core 20 acts toward the inner circumferential end portion 32c of the permanent magnet piece 32 via the holding part 22. More specifically, as indicated by broken arrows in FIG. 10, the opposing magnetic field acts on a position of the inner circumferential end portion 32c of the permanent magnet piece 32 which does not overlap the holding part 22 in the radial direction.

As shown in FIG. 9, in this embodiment, the protrusion 24 extending from the holding part 22 toward the inner peripheral edge portion 42 of the magnet insertion hole 40 is provided. Accordingly, the opposing magnetic field that has acted on the holding part 22 acts on the protrusion 24. Since the circumferential width d1 of the protrusion 24 is set smaller than the circumferential width D1 of the holding part 22, a magnetic air gap is created between the protrusion 24 and the inner circumferential end portion 32c of the permanent magnet piece 32, thereby preventing the opposing magnetic field from acting toward the inner circumferential end portion 32c of the permanent magnet piece 32 from the protrusion 24. As indicated by broken arrows in FIG. 9, the opposing magnetic field acts from the distal end of the protrusion 24 onto the inner peripheral edge portion 42 of the magnet insertion hole 40, and onto the inner radial end portion of the inner circumferential end portion 32c of the permanent magnet piece 32. In this way, according to this embodiment, the area over which the opposing magnetic field acts on the permanent magnet piece 32 can be prevented.

In particular, the radial width d2 of the protrusion 24 is set larger than the radial width D2 of the holding part 22. Therefore, it is possible to ensure that the opposing magnetic field be readily applied toward the inner peripheral edge portion 42 of the magnet insertion hole 40, while preventing the opposing magnetic field from acting on the inner circumferential end portion 32c of the permanent magnet piece 32 via the holding part 22.

As described above, in this embodiment, the permeance of the permanent magnet piece 32 improves in comparison to the comparative example. In addition, the opposing magnetic field acts on the permanent magnet piece 32 only over a narrow area, that is, the inner radial end portion of the inner circumferential end portion 32c. Accordingly, as shown in FIG. 11, demagnetization occurs in a localized narrow section (the inner radial end portion of the inner circumferential end portion 32c). This means that for the permanent magnet 30 as a whole, it is possible to reduce the demagnetizing factor in comparison to the comparative example (see FIG. 12), thereby improving demagnetization toughness.

Although not shown, if the circumferential width d1 of the protrusion 24 is set equal to the circumferential width D1 of the holding part 22, no magnetic air gap is created between the protrusion 24 and the inner circumferential end portion 32c of the permanent magnet piece 32. Therefore, the opposing magnetic field acts so as to point toward the inner circumferential end portion 32c of the permanent magnet piece 32 from the protrusion 24. At this time, owing to an increase in the volume of the protrusion 24, magnetic permeability improves, and hence the permeance of the permanent magnet 30 improves. However, the effect of such an improvement in permeance is small in comparison to the effect of the increase in opposing magnetic field mentioned above, resulting in deterioration of demagnetization toughness in comparison to the embodiment mentioned above.

As described above, in the rotor 10 for a rotating electric machine according to this embodiment, the rotor core 20 has the holding part 22 formed between the pair of divided permanent magnet pieces 32. The holding part 22 extends radially inwards from the outer peripheral edge portion 44 of the magnet insertion hole 40, and abuts against the inner circumferential end portion 32c of the permanent magnet piece 32. The protrusion 24 is formed on a radial end face of the holding part 22. The protrusion 24 has the circumferential width d1 smaller than the circumferential width D1 of the holding part 22, and extends toward the inner peripheral edge portion 42 of the magnet insertion hole 40. The protrusion 24 is spaced away from the inner peripheral edge portion 42 of the magnet insertion hole 40 in the radial direction. Therefore, it is possible to prevent a decrease in torque due to short-circuiting of main magnetic flux via a center rib as in the related art described in Japanese Unexamined Patent Application Publication No. 2008-219992. Since the circumferential width d1 of the protrusion 24 is smaller than the circumferential width D1 of the holding part 22, a magnetic air gap is created between the protrusion 24 and the inner circumferential end portion 32c of the permanent magnet piece 32. Therefore, in comparison to a case where the above-mentioned magnetic air gap is not provided, such as when the circumferential width d1 of the protrusion 24 is equal to the circumferential width D1 of the holding part 22, it is possible to prevent the opposing magnetic field acting toward the inner circumferential end portion 32c of the permanent magnet piece 32 from the protrusion 24, thereby preventing demagnetization of the permanent magnet 30. Moreover, the protrusion 24 extends toward the inner peripheral edge portion 42 of the magnetic insertion hole 40 from the holding part 22 that abuts against the inner circumferential end portion 32c of the permanent magnet piece 32. Therefore, by adjusting the geometries (the circumferential width d1 and the radial width d2) of the protrusion 24, magnetic resistance and short-circuit flux can be appropriately designed so as to provide desired torque and demagnetization resistance.

Further, the radial width d2 of the protrusion 24 is set larger than the radial width D2 of the holding part 22. Therefore, it is possible to ensure that the opposing magnetic field be readily applied toward the inner peripheral edge portion 42 of the magnet insertion hole 40, while preventing the opposing magnetic field from acting on the inner circumferential end portion 32c of the permanent magnet piece 32 via the holding part 22.

First Modification

Figure 3:
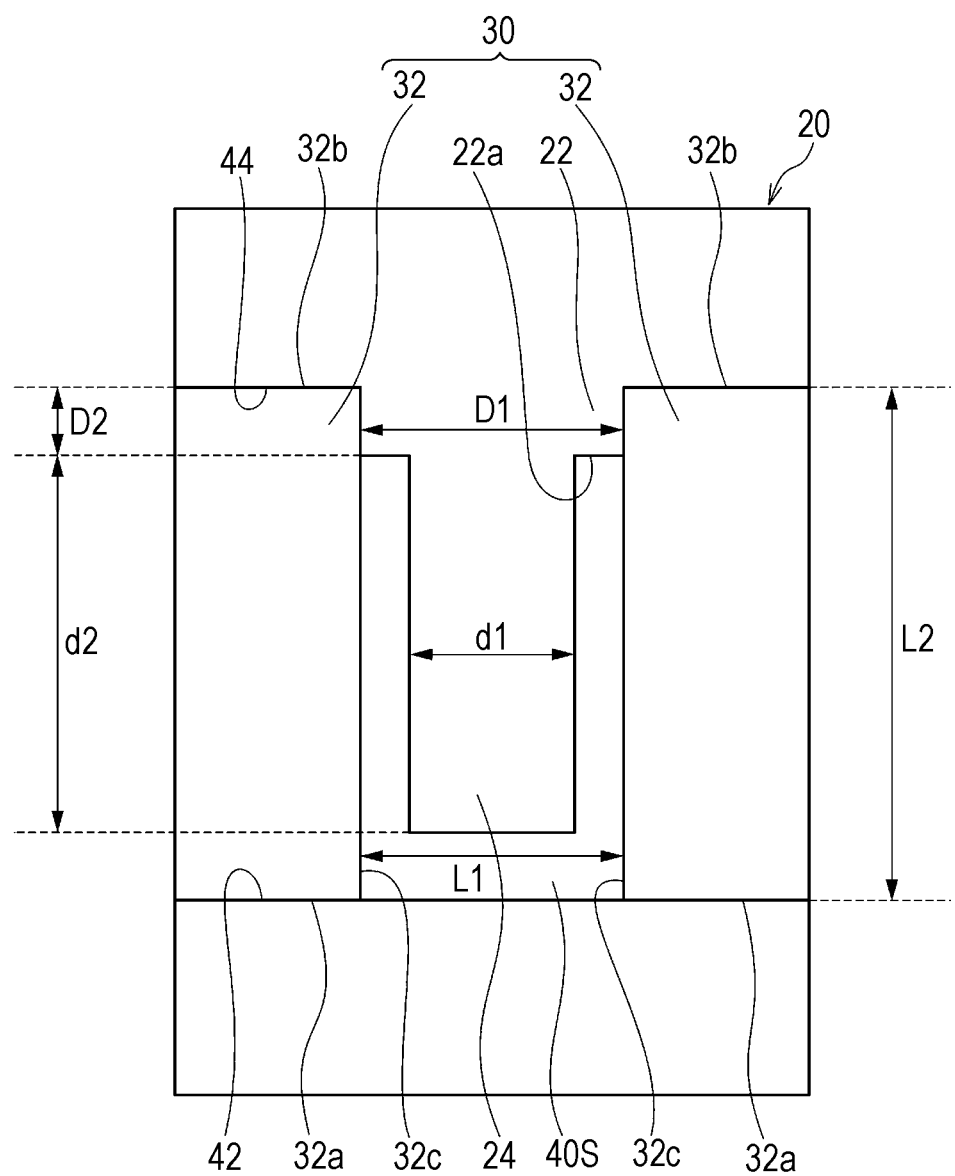
FIG. 3 is an enlarged view of the main portion of the rotor shown in FIG. 1.

In the embodiment mentioned above, the holding part 22 has a substantially rectangular shape in cross section, and the inner radial end face 22a of the holding part 22 is formed as a flat surface (see FIGS. 2 and 3). However, the embodiment is not necessarily limited to this configuration.

Figure 13:
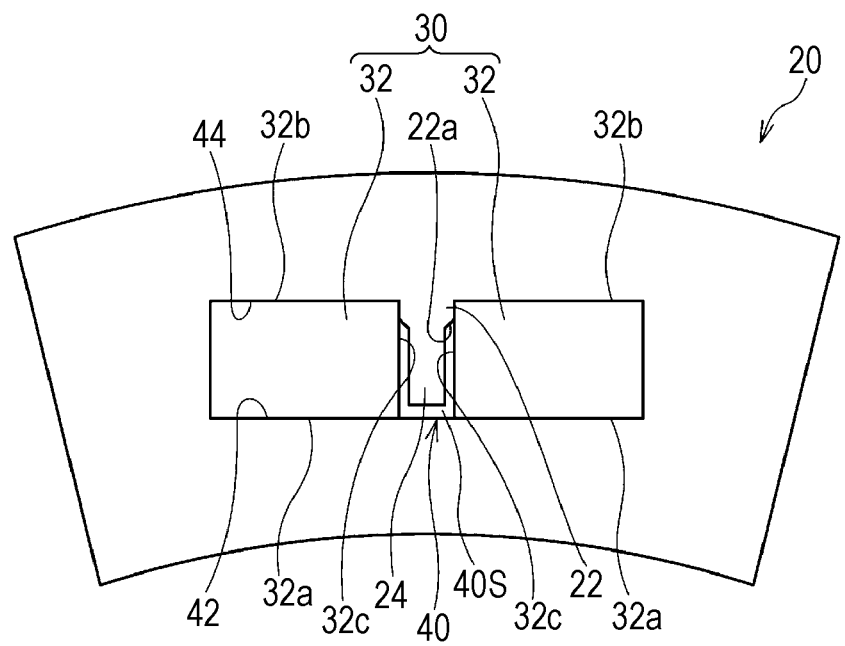
FIG. 13 is a partial enlarged view of a rotor according to a first modification.

For example, as shown in FIG. 13, the inner radial end face 22a of the holding part 22 may be a convex curved surface that extends toward the inner circumferential edge portion 42 of the magnet insertion hole 40 (inwards in the radial direction) as the inner radial end face 22a comes closer to the protrusion 24 in the circumferential direction.

In this case, it is possible to prevent the stress caused by the centrifugal force of the rotor core 52 generated as the rotor core 52 rotates, and the stress caused by the difference in coefficient of linear expansion among the permanent magnet piece 32, the rotor core 20, and the fixing resin filled in the air gap 40S from being concentrated in a part of the joint between the inner radial end face 22a of the holding part 22 and either circumferential end face of the protrusion 24, thereby preventing a decrease in the strength of the rotor core 20.

Second Modification

Figure 14:
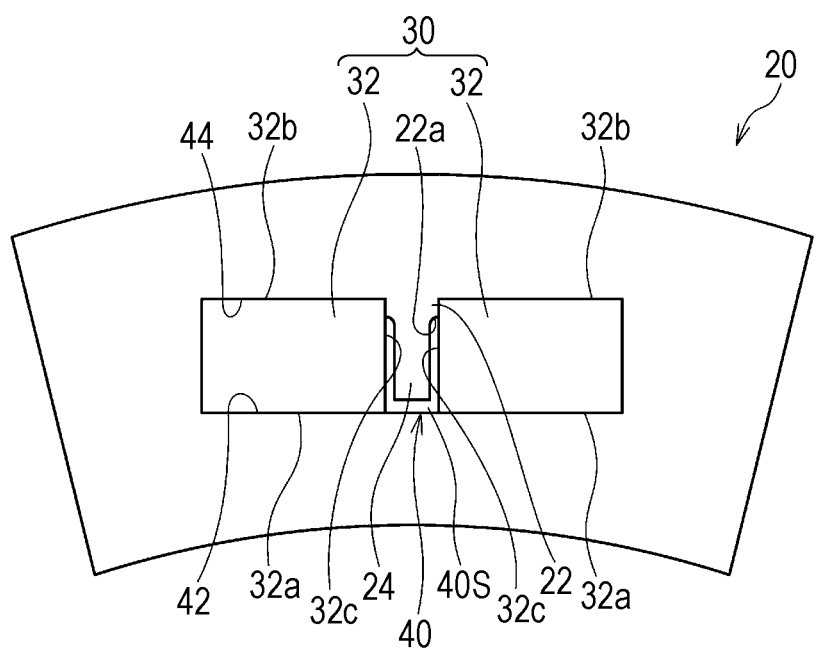
FIG. 14 is a partial enlarged view of a rotor according to a second modification.

Further, as shown in FIG. 14, the inner radial end face 22a of the holding part 22 may be a concave curved surface that extends toward the inner circumferential edge portion 42 of the magnet insertion hole 40 (inwards in the radial direction) as the inner radial end face 22a comes closer to the protrusion 24 in the circumferential direction. Such a configuration can also provide the same effect as that of the first modification mentioned above.

Third Modification

Figure 15:
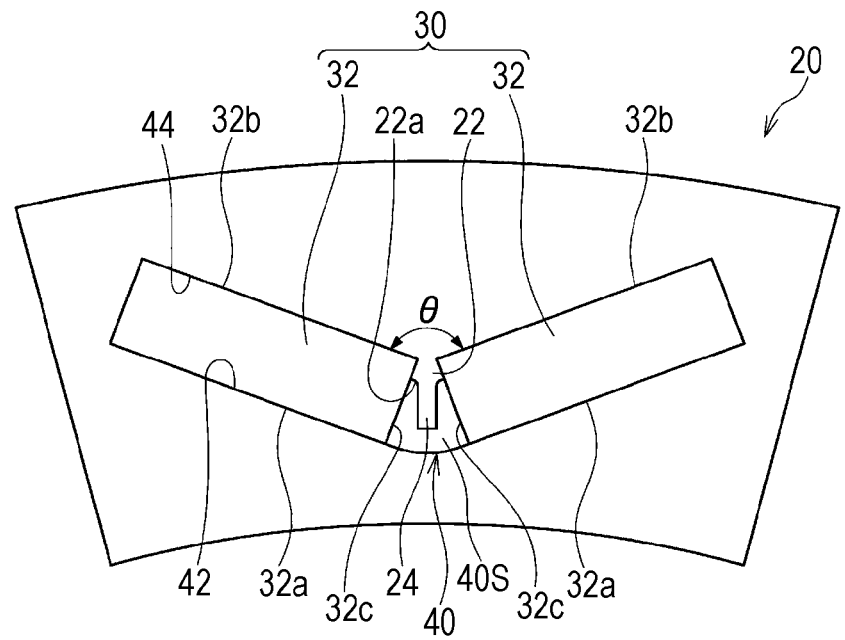
FIG. 15 is a partial enlarged view of a rotor according to a third modification.

In the embodiment mentioned above, the pair of permanent magnet pieces 32 that are adjacent to each other in the circumferential direction are placed in parallel to each other (see FIG. 2). However, as shown in FIG. 15, the pair of permanent magnet pieces 32 may be placed so as not to be in parallel to each other.

More specifically, according to this modification, the magnet insertion hole 40 has a substantially V-shape in cross section so that the outer peripheral surfaces 32b of the pair of permanent magnet pieces 32 that are adjacent to each other in the circumferential direction form an angle θ less than 180° to each other, and the pair of permanent magnet pieces 32 are inserted into the magnet insertion hole 40 to be thereby secured in place. Further, the rotor core 20 has the holding part 22 that is formed between the pair of permanent magnet pieces 32 in the circumferential direction so as to extend radially inwards from the outer peripheral edge portion 44 of the magnet insertion hole 40, and the protrusion 24 that is extended from the inner radial end face 22a of the holding part 22 toward the inner peripheral edge portion 42 of the magnet insertion hole 40. In this regard, the protrusion 24 extends radially inwards so as to be located substantially in the middle between the permanent magnet pieces 32 that are adjacent to each other in the circumferential direction.

Therefore, the circumferential distance between the protrusion 24 and the permanent magnet piece 32 becomes greater from the outer peripheral edge portion 44 side of the magnet insertion hole 40 to the inner peripheral edge portion 42 side, that is, toward the inside in the radial direction.

This configuration makes it possible to ensure that the opposing magnetic field from the stator be readily applied to the inner peripheral edge portion 42 of the magnet insertion hole 40 more effectively, while preventing the opposing magnetic field from acting on the inner circumferential end portion 32c of the permanent magnet piece 32 via the protrusion 24.

Fourth Modification

Figure 16:
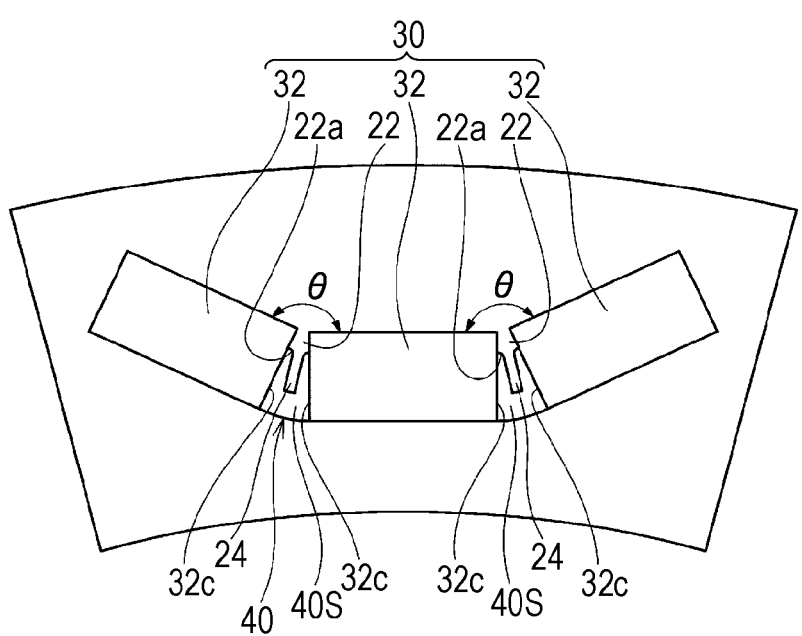
FIG. 16 is a partial enlarged view of a rotor according to a fourth modification.

The permanent magnet 30 constituting the magnetic pole part 50 may be made up of three or more permanent magnet pieces 32 that are divided in the circumferential direction. For example, as shown in FIG. 16, the permanent magnet 30 may be made up of three permanent magnet pieces 32 into which the permanent magnet 30 is divided, and further, the permanent magnet pieces 32 may be placed so that the outer peripheral surfaces 32b of the permanent magnet pieces 32 that are adjacent to each other in the circumferential direction form an angle less than 180° to each other as in the third modification.

In this case, the rotor core 20 has the holding part 22 that is formed between the pair of permanent magnet pieces 32 in the circumferential direction so as to extend radially inwards from the outer peripheral edge portion 44 of the magnet insertion hole 40, and a plurality of protrusions 24 (hereinafter "protrusions 24" or also singularly "protrusion 24") that are each extended from the inner radial end face 22a of the holding part 22 toward the inner peripheral edge portion 42 of the magnet insertion hole 40. In this regard, each of the protrusions 24 extends so as to be located substantially in the middle between the permanent magnet pieces 32 that are adjacent to each other in the circumferential direction.

Therefore, the circumferential distance between the protrusion 24 and the permanent magnet piece 32 becomes greater from the outer peripheral edge portion 44 side of the magnet insertion hole 40 to the inner peripheral edge portion 42 side, that is, toward the inside in the radial direction.

This configuration can also provide the same effect as that of the third modification.

Fifth Modification

Figure 17:
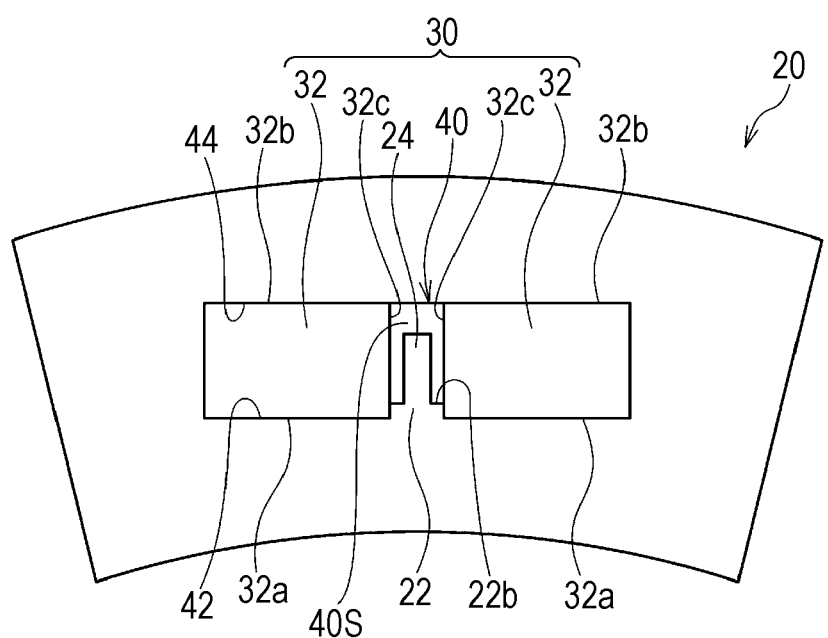
FIG. 17 is a partial enlarged view of a rotor according to a fifth modification.

As shown in FIG. 17, the rotor core 20 may have the holding part 22, and the protrusion 24 as described below. The holding part 22 is formed at a position circumferentially between the permanent magnet pieces 32 that are adjacent to each other in the circumferential direction. The holding part 22 extends radially outwards from the inner peripheral edge portion 42 of the magnet insertion hole 40, and abuts against the inner circumferential end portion 32c of the permanent magnet piece 32. The protrusion 24 is extended from an outer radial end face 22b (radial end face) of the holding part 22 toward the outer peripheral edge portion 44 of the magnet insertion hole 40.

Figure 18:
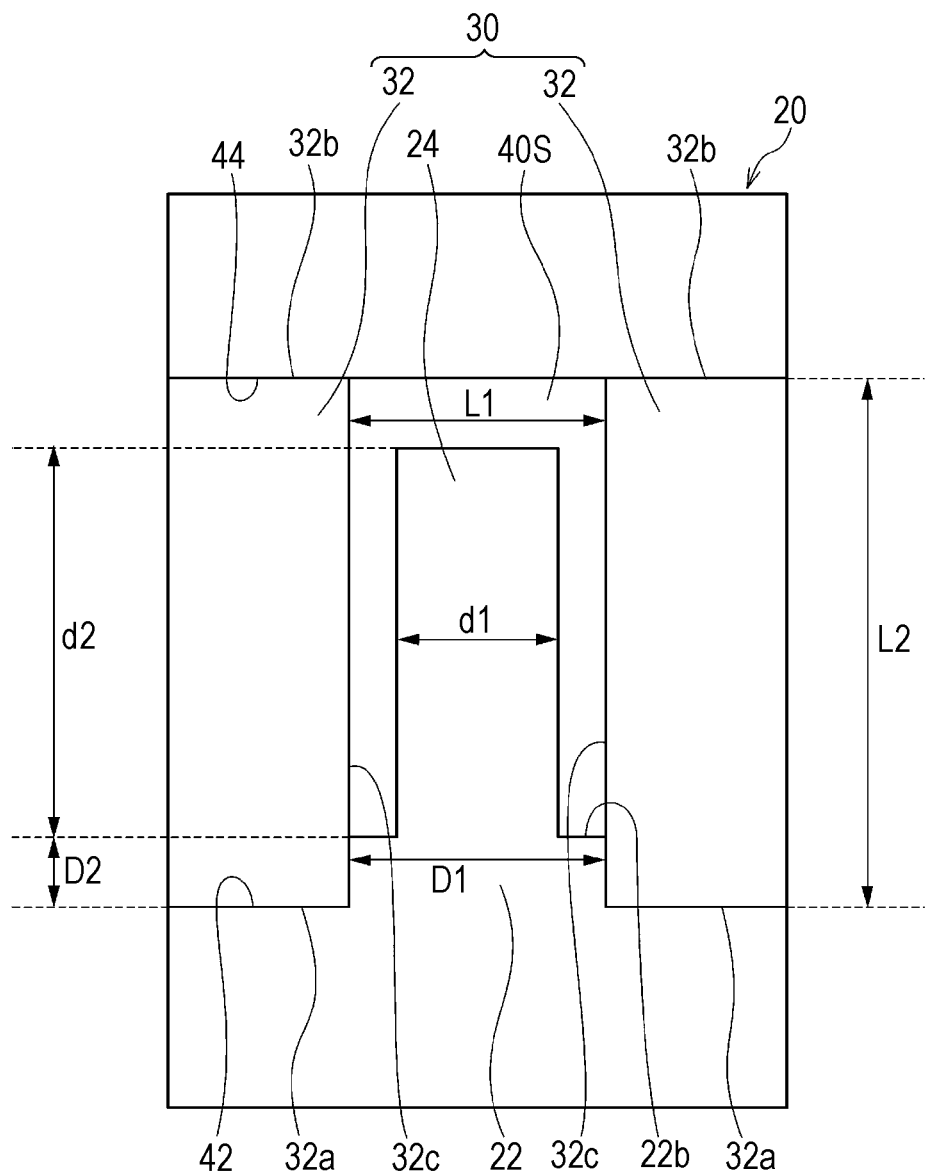
FIG. 18 is an enlarged view of the main portion of the rotor according to the fifth modification.

As shown in FIG. 18, the protrusion 24 has a circumferential width d1 smaller than the circumferential width D1 of the holding part 22, and is spaced away from the inner circumferential end portion 32c of each of the pair of permanent magnet pieces 32.

The radial width d2 of the protrusion 24 is set larger than the radial width D2 of the holding part 22. In this regard, the sum (D2+d2) of the radial widths of the holding part 22 and protrusion 24 is set smaller than the radial width L2 between the inner peripheral edge portion 42 and the outer peripheral edge portion 44 of the magnet insertion hole 40 (D2+d2<L2). Thus, the protrusion 24 is spaced away from the outer peripheral edge portion 44 of the magnet insertion hole 40 in the radial direction. Therefore, short-circuiting of magnetic flux via a center rib as in the related art described in Japanese Unexamined Patent Application Publication No. 2008-219992 is prevented, thereby making it possible to prevent a decrease in torque.

The provision of the protrusion 24 made of laminated steel sheets within the magnetic path causes magnetic permeability to increase, thereby improving the permeance of the permanent magnet piece 32 near the protrusion 24.

The protrusion 24 extending from the holding part 22 toward the outer peripheral edge portion 44 of the magnet insertion hole 40 is provided. Accordingly, the opposing magnetic field from the stator that has acted on the outer peripheral side of the rotor core 20 acts on the protrusion 24. Since the circumferential width d1 of the protrusion 24 is set smaller than the circumferential width D1 of the holding part 22, a magnetic air gap is created between the protrusion 24 and the inner circumferential end portion 32c of the permanent magnet piece 32, thereby preventing the opposing magnetic field from acting toward the inner circumferential end portion 32c of the permanent magnet piece 32 from the protrusion 24. Therefore, the opposing magnetic field that has acted on the protrusion 24 acts on the holding part 22, and then acts on the inner peripheral edge portion 42 of the magnet insertion hole 40, and on the inner radial end portion of the inner circumferential end portion 32c of the permanent magnet piece 32. In this way, this modification also makes it possible to reduce the area over which the opposing magnetic field acts on the permanent magnet piece 32.

In particular, the radial width d2 of the protrusion 24 is set larger than the radial width D2 of the holding part 22. Therefore, it is possible to ensure that the opposing magnetic field be readily applied toward the inner peripheral edge portion 42 of the magnet insertion hole 40, while preventing the opposing magnetic field from acting on the inner circumferential end portion 32c of the permanent magnet piece 32 via the holding part 22.

In this way, according to this modification, as in the first embodiment mentioned above, it is possible to improve the permeance of the permanent magnet piece 32, and improve the demagnetization toughness of the permanent magnet piece 32 against the opposing magnetic field.

Sixth Modification

Figure 19:
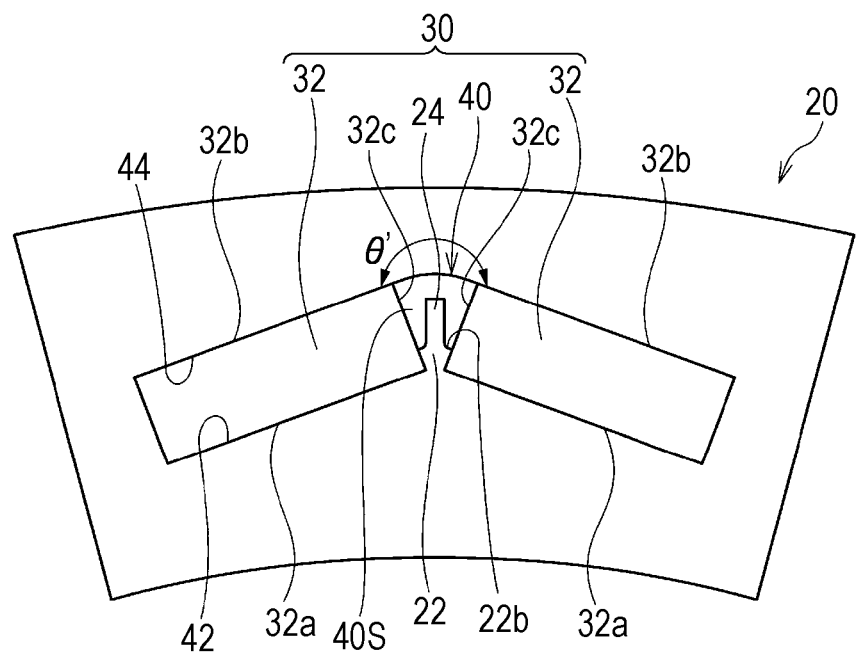
FIG. 19 is a partial enlarged view of a rotor according to a sixth modification.

Also in the case of a configuration in which, as in the fifth modification, the protrusion 24 is extended toward the outer peripheral edge portion 44 of the magnet insertion hole 40 from the outer radial end face 22b of the holding part 22, the pair of permanent magnet pieces 32 may be placed so as not to be in parallel to each other as shown in FIG. 19.

More specifically, according to this modification, the magnet insertion hole 40 has a substantially inverted V-shape in cross section so that the outer peripheral surfaces 32b of the pair of permanent magnet pieces 32 that are adjacent to each other in the circumferential direction form an angle θ' greater than 180° to each other, and the pair of permanent magnet pieces 32 are inserted into the magnet insertion hole 40 to be thereby secured in place. Further, the rotor core 20 has the holding part 22 that is formed between the pair of permanent magnet pieces 32 in the circumferential direction so as to extend radially outwards from the inner peripheral edge portion 42 of the magnet insertion hole 40, and the protrusion 24 that is extended from the outer radial end face 22b of the holding part 22 toward the outer peripheral edge portion 44 of the magnet insertion hole 40.

Therefore, the circumferential distance between the protrusion 24 and the permanent magnet piece 32 becomes greater from the inner peripheral edge portion 42 side of the magnet insertion hole 40 to the outer peripheral edge portion 44 side, that is, toward the outside in the radial direction.

This configuration makes it possible to ensure that the opposing magnetic field from the stator be readily applied to the inner peripheral edge portion 42 of the magnet insertion hole 40 more effectively, while preventing the opposing magnetic field from acting on the inner circumferential end portion 32c of the permanent magnet piece 32 via the protrusion 24.

Second Embodiment

Next, the rotor 10 for a rotating electric machine according to a second embodiment will be described. Since the basic configuration of the rotor 10 according to this embodiment is the same as that of the first embodiment, the following description will mainly focus on differences from the first embodiment, and portions that are the same or equivalent to those of the first embodiment will be denoted by the same symbols to omit or simplify the description of those portions.

Figure 20:
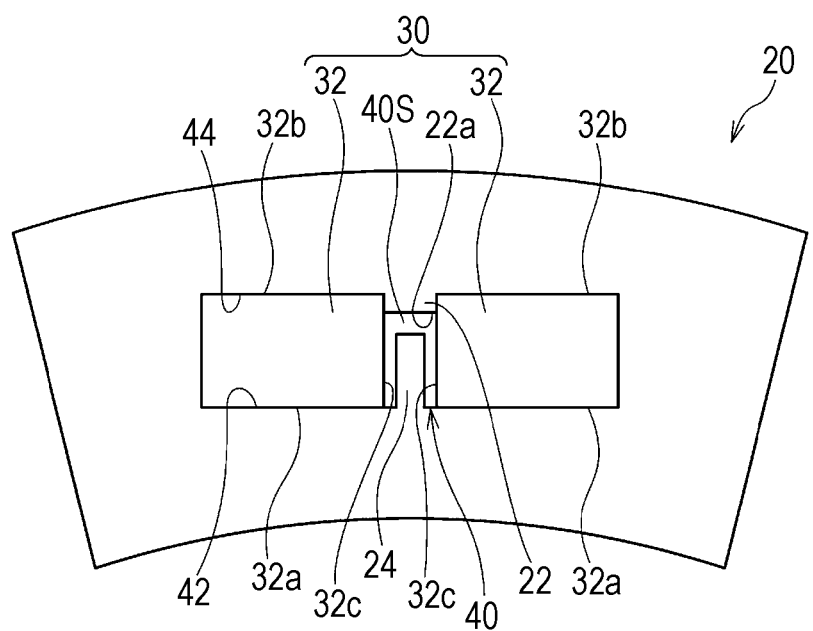
FIG. 20 is a partial enlarged view of a rotor according to a second embodiment.
Figure 21:
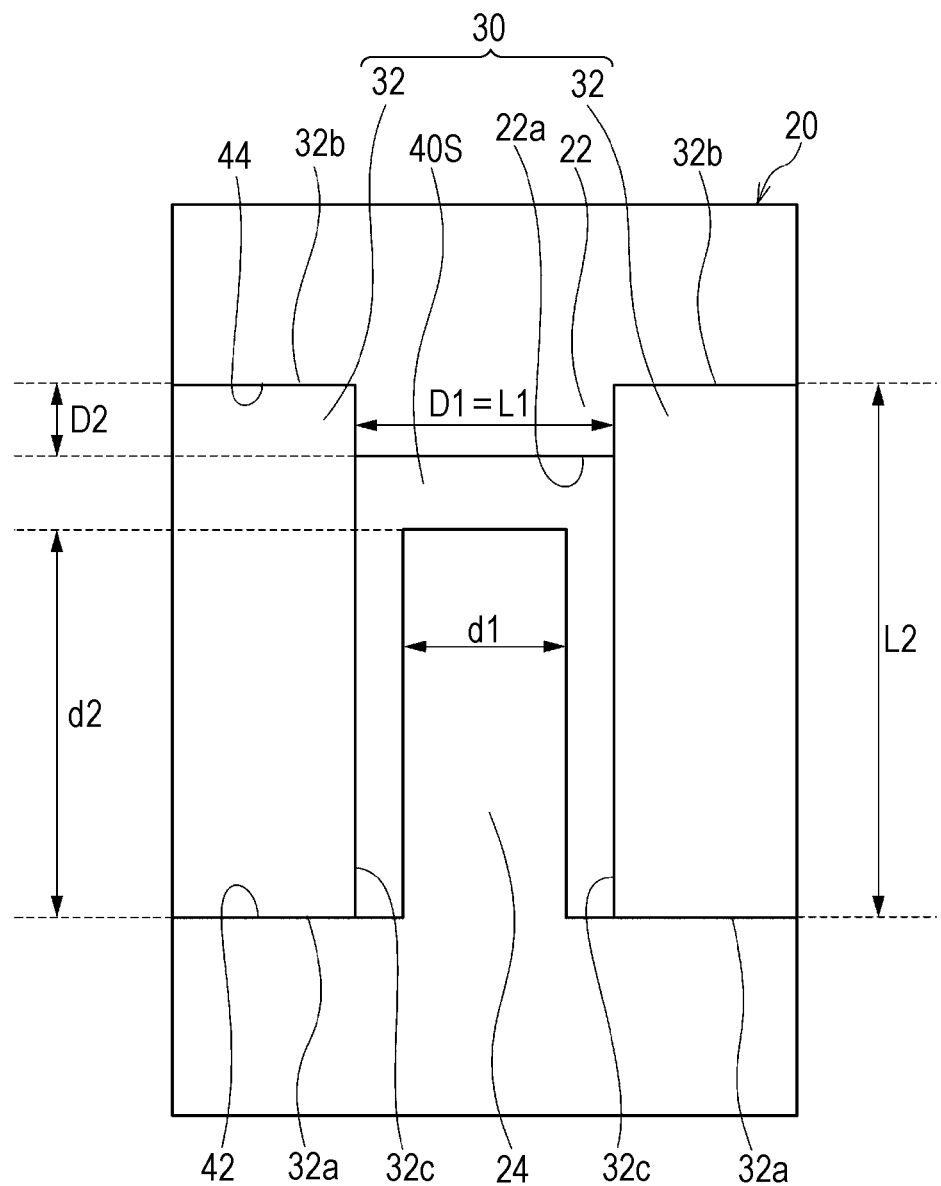
FIG. 21 is an enlarged view of the main portion of the rotor according to the second embodiment.

As shown in FIGS. 20 and 21, the rotor core 20 according to this embodiment has the holding part 22, and the protrusion 24 as described below. The holding part 22 is formed at a position circumferentially between the permanent magnet pieces 32 that are adjacent to each other in the circumferential direction. The holding part 22 extends radially inwards from the outer peripheral edge portion 44 of the magnet insertion hole 40, and abuts against the inner circumferential end portion 32c of the permanent magnet piece 32. The protrusion 24 is formed at a position circumferentially between the permanent magnet pieces 32 that are adjacent to each other in the circumferential direction. The protrusion 24 extends radially outwards from the inner peripheral edge portion 42 of the magnet insertion hole 40.

The holding part 22 has a circumferential width D1 that is substantially equal to the circumferential width L1 between the pair of permanent magnet pieces 32. The holding part 22 abuts against the inner circumferential end portion 32c (circumferential end portion) of each of the pair of permanent magnet pieces 32, thereby positioning and holding the pair of permanent magnet pieces 32 in place in the circumferential direction.

The protrusion 24 has a circumferential width d1 that is smaller than the circumferential width D1 of the holding part 22. The protrusion 24 is thus spaced away from the inner circumferential end portion 32c of each of the pair of permanent magnet pieces 32.

The radial width d2 of the protrusion 24 is set larger than the radial width D2 of the holding part 22. In this regard, the sum (D2+d2) of the radial widths of the holding part 22 and protrusion 24 is set smaller than the radial width L2 between the inner peripheral edge portion 42 and the outer peripheral edge portion 44 of the magnet insertion hole 40 (D2+d2<L2). Thus, the holding part 22 and the protrusion 24 are spaced away from each other in the radial direction. Therefore, short-circuiting of magnetic flux via a center rib as in the related art described in Japanese Unexamined Patent Application Publication No. 2008-219992 is prevented, thereby making it possible to prevent a decrease in torque.

The provision of the protrusion 24 made of laminated steel sheets within the magnetic path causes magnetic permeability to increase, thereby improving the permeance of the permanent magnet piece 32 near the protrusion 24.

The protrusion 24 extending radially outwards from the inner peripheral edge portion 42 of the magnet insertion hole 40 is provided. Accordingly, the opposing magnetic field from the stator acts on the protrusion 24 via the holding part 22. Since the circumferential width d1 of the protrusion 24 is set smaller than the circumferential width D1 of the holding part 22, a magnetic air gap is created between the protrusion 24 and the inner circumferential end portion 32c of the permanent magnet piece 32, thereby preventing the opposing magnetic field from acting toward the inner circumferential end portion 32c of the permanent magnet piece 32 from the protrusion 24.

In particular, the radial width d2 of the protrusion 24 is set larger than the radial width D2 of the holding part 22. Therefore, it is possible to ensure that the opposing magnetic field be readily applied toward the inner peripheral edge portion 42 of the magnet insertion hole 40, while preventing the opposing magnetic field from acting on the inner circumferential end portion 32c of the permanent magnet piece 32 via the holding part 22.

In this way, this embodiment can also provide substantially the same effect as that of the first embodiment mentioned above.

It is needless to mention that in the second embodiment as well, the permanent magnet 30 constituting the magnetic pole part 50 may be made up of three or more permanent magnet pieces 32 that are divided in the circumferential direction.

Seventh Modification

Figure 22:
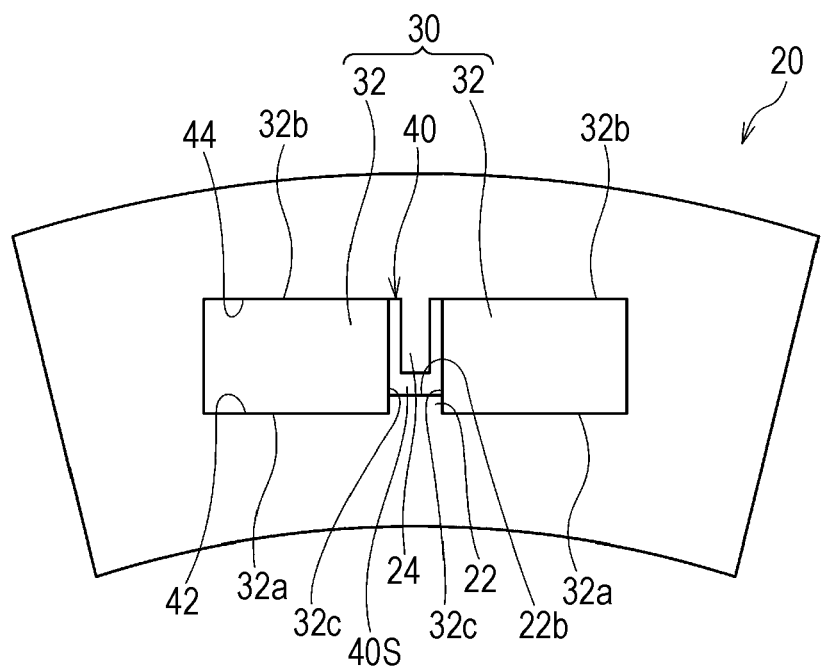
FIG. 22 is a partial enlarged view of a rotor according to a seventh modification.
Figure 23:
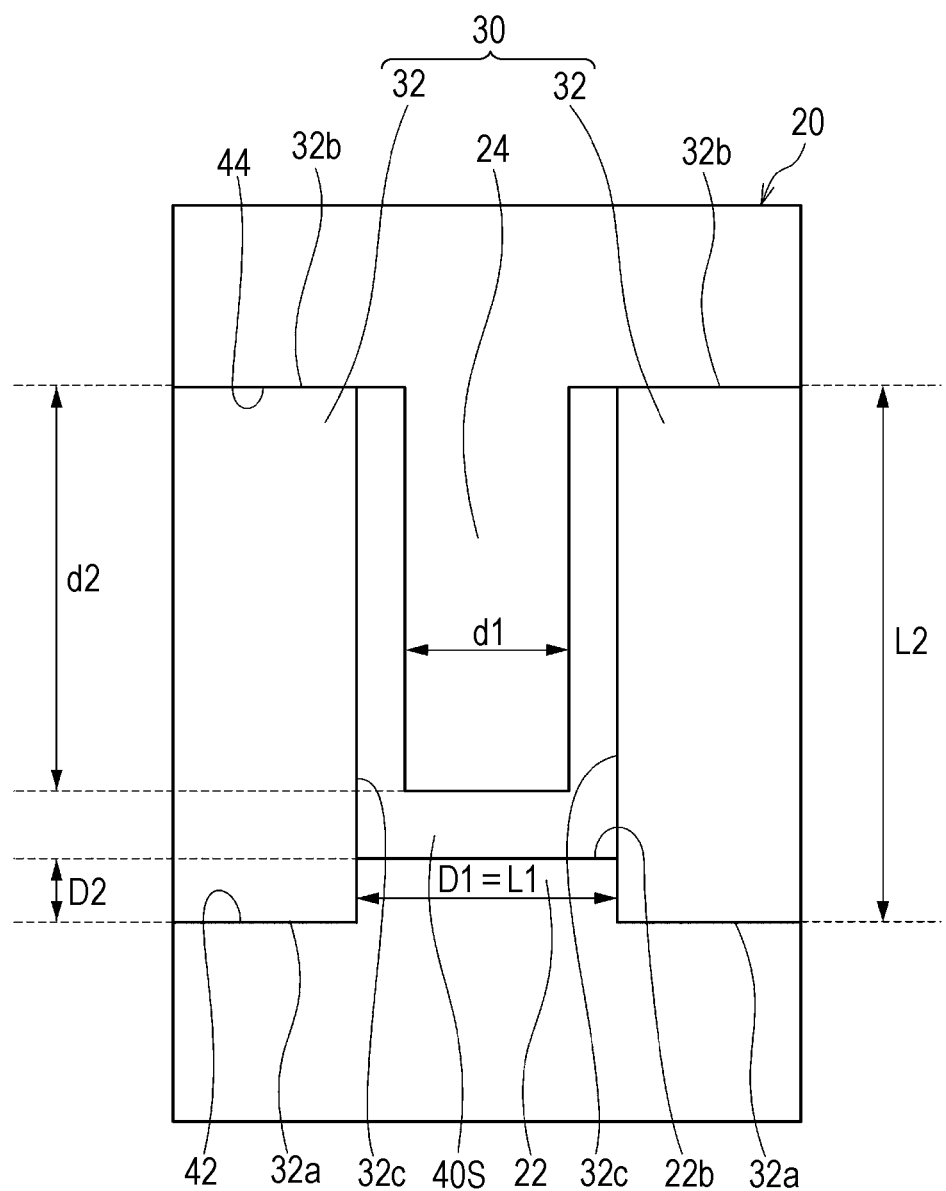
FIG. 23 is an enlarged view of the main portion of the rotor according to the seventh modification.
Figure 24:
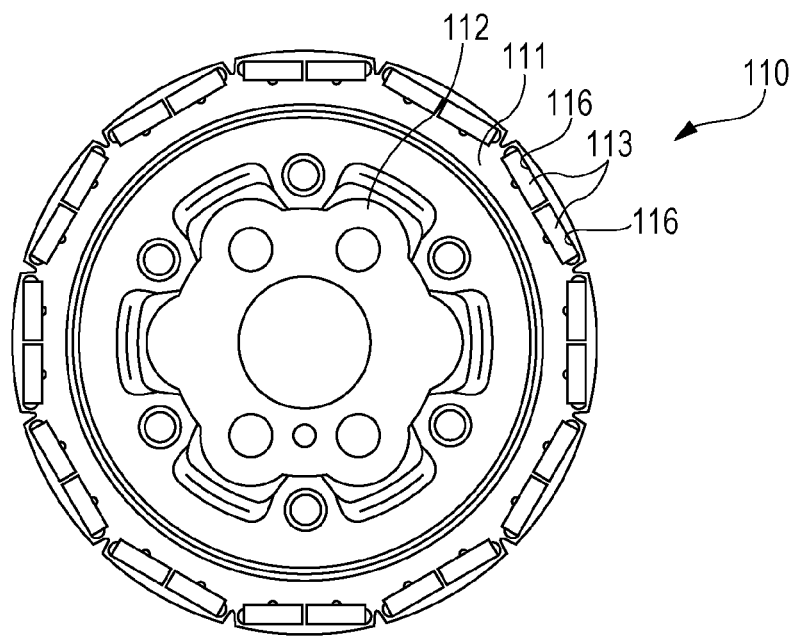
FIG. 24 is a front view of a rotor according to Japanese Unexamined Patent Application Publication No. 2008-219992.

As shown in FIGS. 22 and 23, the rotor core 20 may have the holding part 22, and the protrusion 24 as described below. The holding part 22 is formed at a position circumferentially between the permanent magnet pieces 32 that are adjacent to each other in the circumferential direction. The holding part 22 extends radially outwards from the inner peripheral edge portion 42 of the magnet insertion hole 40, and abuts against the inner circumferential end portion 32c of the permanent magnet piece 32. The protrusion 24 is formed at a position circumferentially between the permanent magnet pieces 32 that are adjacent to each other in the circumferential direction. The protrusion 24 extends radially outwards from the outer peripheral edge portion 44 of the magnet insertion hole 40.

The protrusion 24 has a circumferential width d1 that is smaller than the circumferential width D1 of the holding part 22. The protrusion 24 is thus spaced away from the inner circumferential end portion 32c of each of the pair of permanent magnet pieces 32.

The radial width d2 of the protrusion 24 is set larger than the radial width D2 of the holding part 22. In this regard, the sum (D2+d2) of the radial widths of the holding part 22 and protrusion 24 is set smaller than the radial width L2 between the inner peripheral edge portion 42 and the outer peripheral edge portion 44 of the magnet insertion hole 40 (D2+d2<L2). Thus, the holding part 22 and the protrusion 24 are spaced away from each other in the radial direction.

According to this modification, as in the second embodiment mentioned above, it is possible to improve the permeance of the permanent magnet piece 32, and improve the demagnetization toughness of the permanent magnet piece 32 against the opposing magnetic field.

Embodiments of the rotor 10 for a rotating electric machine are not limited to the above embodiments but may be subject to various modifications, improvements, and the like as appropriate.

According to a first aspect of the embodiments, there is provided a rotor (for example, a rotor 10 according to the embodiments) for a rotating electric machine, the rotor including a rotor core (for example, a rotor core 20 according to the embodiments) that has a magnet insertion hole (for example, a magnet insertion hole 40 according to the embodiments), and a plurality of magnetic pole parts (for example, magnetic pole parts 50 according to the embodiments) that are provided inside the rotor core at a predetermined interval in a circumferential direction, the magnetic pole parts being magnetized in a radial direction, the magnetic pole parts differing in their magnetization direction alternately in the circumferential direction. Each of the magnetic pole parts includes a permanent magnet (for example, a permanent magnet 30 according to the embodiments) inserted in the magnet insertion hole of the rotor core. The permanent magnet includes a plurality of permanent magnet pieces (for example, permanent magnet pieces 32 according to the embodiments) that are divided in the circumferential direction and placed within the magnet insertion hole. The rotor core has a holding part (for example, a holding part 22 according to the embodiments) formed between the permanent magnet pieces that are adjacent to each other in the circumferential direction, and a protrusion (for example, a protrusion 24 according to the embodiments) formed on a radial end face (for example, an inner radial end face 22a or an outer radial end face 22b according to the embodiments) of the holding part. The holding part extends along the radial direction from one of an inner peripheral edge portion (for example, an inner peripheral edge portion 42 according to the embodiments) and an outer peripheral edge portion (for example, an outer peripheral edge portion 44 according to the embodiments) of the magnet insertion hole. The holding part abuts against a circumferential end portion (for example, an inner circumferential end portion 32c according to the embodiments) of each of the permanent magnet pieces. The protrusion has a circumferential width (for example, a circumferential width d1 according to the embodiments) smaller than the holding part, and extends toward another one of the inner peripheral edge portion and the outer peripheral edge portion of the magnet insertion hole. The protrusion is spaced away in the radial direction from the other one of the inner peripheral edge portion and the outer peripheral edge portion of the magnet insertion hole. According to the first aspect of the embodiments mentioned above, it is possible to prevent a decrease in torque due to short-circuiting of main magnetic flux via a center rib as in the related art described in Japanese Unexamined Patent Application Publication No. 2008-219992. Since the circumferential width of the protrusion is smaller than the circumferential width of the holding part, a magnetic air gap is created between the protrusion and the inner circumferential end portion of each of the permanent magnet pieces. Therefore, in comparison to a case where the above-mentioned magnetic air gap is not provided, such as when the circumferential width of the protrusion is equal to the circumferential width of the holding part, it is possible to prevent the opposing magnetic field acting from the protrusion toward the circumferential end portion of each of the permanent magnet pieces, thereby preventing demagnetization of the permanent magnet. Moreover, the protrusion extends toward the other one of the inner peripheral edge portion and the outer peripheral edge portion of the magnet insertion hole from the holding part that abuts against the circumferential end portion of each of the permanent magnet pieces. Therefore, by adjusting the geometries of the protrusion, magnetic resistance and short-circuit flux can be appropriately designed so as to provide desired torque and demagnetization resistance.

In a second aspect of the embodiments, in addition to the configuration according to the first aspect, preferably, the permanent magnet pieces have a rectangular shape in cross section, the permanent magnet pieces are placed so that the permanent magnet pieces that are adjacent to each other in the circumferential direction are not in parallel to each other, and the protrusion and the circumferential end portion of each of the permanent magnet pieces increase in distance from each other, from one of the inner peripheral edge portion and the outer peripheral edge portion of the magnet insertion hole toward another one of the inner peripheral edge portion and the outer peripheral edge portion of the magnet insertion hole. According to the second aspect of the embodiments mentioned above, it is possible to ensure that the opposing magnetic field be readily applied toward the inner peripheral edge portion of the magnet insertion hole more effectively, while preventing the opposing magnetic field from acting on the circumferential end portion of each of the permanent magnet pieces via the protrusion.

In a third aspect of the embodiments, in addition to the configuration according to the first aspect, preferably, the protrusion has a radial width (for example, a radial width d2 according to the embodiments) that is larger than a radial width (for example, a radial width D2 according to the embodiments) of the holding part. According to the third aspect of the embodiments mentioned above, it is possible to ensure that the opposing magnetic field be readily applied toward the inner peripheral edge portion of the magnet insertion hole more effectively, while preventing the opposing magnetic field from acting on the circumferential end portion of each of the permanent magnet pieces via the holding part.

In a fourth aspect of the embodiments, in addition to the configuration according to the first aspect, preferably, the radial end face of the holding part is a curved surface (for example, a convex curved surface or a concave curved surface according to the embodiments) that extends toward the other one of the inner peripheral edge portion and the outer peripheral edge portion of the magnet insertion hole as the radial end face comes closer to the protrusion in the circumferential direction. According to the fourth aspect of the embodiments mentioned above, it is possible to prevent the stress caused by the centrifugal force of the rotor core generated as the rotor core rotates, and the stress caused by the difference in coefficient of linear expansion between each of the permanent magnet pieces and the rotor core when a temperature change occurs from being concentrated in a part of the joint between the inner radial end face of the holding part and either circumferential end face of the protrusion, thereby preventing a decrease in the strength of the rotor core.

In a fifth aspect of the embodiments, there is provided a rotor (for example, a rotor 10 according to the embodiments) for a rotating electric machine, the rotor including a rotor core (for example, a rotor core 20 according to the embodiments) that has a magnet insertion hole (for example, a magnet insertion hole 40 according to the embodiments), and a plurality of magnetic pole parts (for example, mag- netic pole parts 50 according to the embodiments) that are provided inside the rotor core at a predetermined interval in a circumferential direction, the magnetic pole parts being magnetized in a radial direction, the magnetic pole parts differing in their magnetization direction alternately in the circumferential direction. Each of the magnetic pole parts includes a permanent magnet (for example, a permanent magnet 30 according to the embodiments) inserted in the magnet insertion hole of the rotor core. The permanent magnet includes a plurality of permanent magnet pieces (for example, permanent magnet pieces 32 according to the embodiments) that are divided in the circumferential direction and placed within the magnet insertion hole. The rotor core has a holding part (for example, a holding part 22 according to the embodiments) formed between the permanent magnet pieces that are adjacent to each other in the circumferential direction, and a protrusion (for example, a protrusion 24 according to the embodiments) formed between the permanent magnet pieces that are adjacent to each other in the circumferential direction. The holding part extends along the radial direction from one of an inner peripheral edge portion (for example, an inner peripheral edge portion 42 according to the embodiments) and an outer peripheral edge portion (for example, an outer peripheral edge portion 44 according to the embodiments) of the magnet insertion hole. The holding part abuts against a circumferential end portion (for example, an inner circumferential end portion 32c according to the embodiments) of each of the permanent magnet pieces. The protrusion extends along the radial direction from another one of the inner peripheral edge portion and the outer peripheral edge portion of the magnet insertion hole. The protrusion has a circumferential width (for example, circumferential width d1 according to the embodiments) smaller than the holding part. The holding part and the protrusion are spaced away from each other in the radial direction. According to the fifth aspect of the embodiments mentioned above, it is possible to obtain the same effect as that of the first aspect of the embodiments.

In a sixth aspect of the embodiments, in addition to the configuration according to the fifth aspect, preferably, the protrusion has a radial width (for example, a radial width d2 according to the embodiments) that is larger than a radial width (for example, a radial width D2 according to the embodiments) of the holding part. According to the sixth aspect of the embodiments mentioned above, it is possible to obtain the same effect as that of the third aspect of the embodiments.

Obviously, numerous modifications and variations of the present invention are possible in light of the above teachings. It is therefore to be understood that within the scope of the appended claims, the invention may be practiced otherwise than as specifically described herein.

What is claimed is:

1. A rotor for a rotating electric machine, comprising:
a rotor core that has a magnet insertion hole comprising:
a first peripheral edge portion; and
a second peripheral edge portion spaced away from the first peripheral edge portion in a radial direction of the rotor;
a plurality of magnetic pole parts that are provided inside the rotor core at a predetermined interval in a circumferential direction of the rotor, the plurality of magnetic pole parts being magnetized in the radial direction, the plurality of magnetic pole parts being provided such that magnetization directions of the plurality of magnetic pole parts are alternately different from each other in the circumferential direction, each of the plurality of magnetic pole parts including a permanent magnet provided in the magnet insertion hole of the rotor core, the permanent magnet including a plurality of permanent magnet pieces that are divided in the circumferential direction within the magnet insertion hole; and the rotor core comprising:
- a holding part provided between the plurality of permanent magnet pieces that are adjacent to each other in the circumferential direction, the holding part extending along the radial direction from the first peripheral edge portion of the magnet insertion hole, the holding part abutting against a circumferential end portion of each of the plurality of permanent magnet pieces; and
- a protrusion provided on a radial end face of the holding part, the protrusion having a circumferential width smaller than a circumferential width of the holding part, the protrusion extending toward the second peripheral edge portion of the magnet insertion hole, the protrusion being spaced away in the radial direction from the second peripheral edge portion of the magnet insertion hole, wherein the first peripheral edge portion of the magnet insertion hole comprises an outer peripheral edge portion, wherein the second peripheral edge portion of the magnet insertion hole comprises an inner peripheral edge portion provided on an inner side of the outer peripheral edge portion in the radial direction, and wherein the protrusion and the circumferential end portion of an adjacent permanent magnet piece of the plurality of permanent magnet pieces increase in distance from each other as each of the protrusion and the circumferential end portion of the adjacent permanent magnet piece extend along their length from the outer peripheral edge portion toward the inner peripheral edge portion.

2. The rotor for a rotating electric machine according to claim 1, wherein
the plurality of permanent magnet pieces have a rectangular shape in cross section, and
the plurality of permanent magnet pieces are placed so that the plurality of permanent magnet pieces that are adjacent to each other in the circumferential direction are not in parallel to each other.

3. The rotor for a rotating electric machine according to claim 1, wherein the protrusion has a radial width that is larger than a radial width of the holding part.

4. The rotor for a rotating electric machine according to claim 3, wherein the protrusion is spaced away from the circumferential end portion of each of the plurality of permanent magnet pieces in the circumferential direction.

5. The rotor for a rotating electric machine according to claim 1, wherein the radial end face of the holding part comprises a curved surface that extends toward the second peripheral edge portion as the radial end face comes closer to the protrusion in the circumferential direction.

6. The rotor for a rotating electric machine according to claim 1, wherein the protrusion has a constant circumferential width along an entire radial length of the protrusion.

7. A rotor for a rotating electric machine, comprising:
a rotor core that has a magnet insertion hole comprising:
- a first peripheral edge portion; and
- a second peripheral edge portion spaced away from the first peripheral edge portion in a radial direction of the rotor;

a plurality of magnetic pole parts that are provided inside the rotor core at a predetermined interval in a circumferential direction of the rotor, the plurality of magnetic pole parts being magnetized in the radial direction, the plurality of magnetic pole parts being provided such that magnetization directions of the plurality of magnetic pole parts are alternately in the circumferential direction, each of the plurality of magnetic pole parts including a permanent magnet provided in the magnet insertion hole of the rotor core, the permanent magnet including a plurality of permanent magnet pieces that are divided in the circumferential direction within the magnet insertion hole; and the rotor core comprising:
- a holding part provided between the plurality of permanent magnet pieces that are adjacent to each other in the circumferential direction, the holding part extending along the radial direction from the first peripheral edge portion of the magnet insertion hole and toward the second peripheral edge portion, the holding part abutting against a circumferential end portion of each of the plurality of permanent magnet pieces, and
- a protrusion provided between the plurality of permanent magnet pieces that are adjacent to each other in the circumferential direction, the protrusion extending along the radial direction from the second peripheral edge portion of the magnet insertion hole and protruding toward the first peripheral edge portion, the protrusion having a circumferential width smaller than a circumferential width of the holding part, the holding part and the protrusion being spaced away from each other in the radial direction.

8. The rotor for a rotating electric machine according to claim 7, wherein the protrusion has a radial width that is larger than a radial width of the holding part.

9. The rotor for a rotating electric machine according to claim 7,
wherein the first peripheral edge portion of the magnet insertion hole comprises an outer peripheral edge portion, and
wherein the second peripheral edge portion of the magnet insertion hole comprises an inner peripheral edge portion provided on an inner side of the outer peripheral edge portion in the radial direction.

10. The rotor for a rotating electric machine according to claim 7, wherein the protrusion is spaced away from the circumferential end portion of each of the plurality of permanent magnet pieces in the circumferential direction.

11. The rotor for a rotating electric machine according to claim 7,
wherein the first peripheral edge portion of the magnet insertion hole comprises inner peripheral edge portion, and
wherein the second peripheral edge portion of the magnet insertion hole comprises an outer peripheral edge portion provided on an outer side of the inner peripheral edge portion in the radial direction.

12. The rotor for a rotating electric machine according to claim 7, wherein the protrusion is spaced away in the radial direction from the first peripheral edge portion of the magnet insertion hole.

13. The rotor for a rotating electric machine according to claim 7, wherein the protrusion has a constant circumferential width along an entire radial length of the protrusion.

* * * * *